(12) United States Patent
Persson

(10) Patent No.: US 10,696,437 B2
(45) Date of Patent: *Jun. 30, 2020

(54) METHOD FOR PRODUCING AN ORAL POUCHED SNUFF PRODUCT

(71) Applicant: Swedish Match North Europe AB, Stockholm (SE)

(72) Inventor: Tony Persson, Herrljunga (SE)

(73) Assignee: Swedish Match North Europe AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/519,634

(22) Filed: Jul. 23, 2019

(65) Prior Publication Data

US 2019/0344915 A1    Nov. 14, 2019

Related U.S. Application Data

(63) Continuation of application No. 15/760,410, filed as application No. PCT/EP2016/079592 on Dec. 2, 2016.

(30) Foreign Application Priority Data

Dec. 2, 2015 (EP) .................................. 15197533

(51) Int. Cl.
*B32B 37/00* (2006.01)
*B65B 51/22* (2006.01)
(Continued)

(52) U.S. Cl.
CPC ............ *B65B 51/225* (2013.01); *A24B 13/00* (2013.01); *B29C 65/08* (2013.01);
(Continued)

(58) Field of Classification Search
CPC ..... B65B 51/225; B65B 51/303; B65B 9/207; A24B 13/00; B29C 65/08; B29C 65/7443;
(Continued)

(56) References Cited

U.S. PATENT DOCUMENTS

| 4,703,765 A | 11/1987 | Paules et al. |
| 6,135,120 A | 10/2000 | Lofman et al. |

(Continued)

FOREIGN PATENT DOCUMENTS

| EP | 2428450 B1 | 3/2012 |
| FR | 2 891 188 | 3/2007 |

(Continued)

OTHER PUBLICATIONS

AOAC (Association of Official Analytical Chemics), Official Methods of Analysis 966.02: "Moisture in Tobacco" (1990), Fifth Edition, K. Helrich (ed).

(Continued)

*Primary Examiner* — James D Sells
(74) *Attorney, Agent, or Firm* — Knobbe Martens Olson & Bear LLP

(57) ABSTRACT

The present disclosure relates to a method for producing an oral pouched snuff product comprising a filling material (29, 10) and a saliva-permeable pouch (43) enclosing the filling material (29, 10), the product (29, 10) having a moisture content of at most 20% by weight, in particular at most 10% by weight, based on total weight of the product (29, 10), the saliva-permeable pouch (43) having one or more seals (45, 46), and said filling material (29, 10) comprising at least 20% by weight, based on dry weight of the filling material (29, 10), of at least one ingredient having a melting temperature below 180° C., the method comprising ultrasonically welding and cutting an advancing web (32) of pack- (Continued)

aging material (7) to which the filling material (29, 10) has been supplied. The present disclosure also provides an oral pouched snuff product which is obtainable by this method.

19 Claims, 9 Drawing Sheets

(51) Int. Cl.
A24B 13/00 (2006.01)
B65B 51/30 (2006.01)
B65B 9/207 (2012.01)
B29C 65/08 (2006.01)
B29C 65/74 (2006.01)
B29C 65/00 (2006.01)
B65B 61/06 (2006.01)
B65B 51/26 (2006.01)
B29C 65/82 (2006.01)
B29L 31/00 (2006.01)
B65B 1/06 (2006.01)
B29C 65/18 (2006.01)
B65B 61/12 (2006.01)
B65B 29/00 (2006.01)

(52) U.S. Cl.
CPC ...... *B29C 65/7443* (2013.01); *B29C 65/8253* (2013.01); *B29C 66/0042* (2013.01); *B29C 66/1122* (2013.01); *B29C 66/4312* (2013.01); *B29C 66/49* (2013.01); *B29C 66/7373* (2013.01); *B29C 66/81413* (2013.01); *B29C 66/81417* (2013.01); *B29C 66/81419* (2013.01); *B29C 66/81435* (2013.01); *B29C 66/83543* (2013.01); *B29C 66/8491* (2013.01); *B65B 9/207* (2013.01); *B65B 51/26* (2013.01); *B65B 51/303* (2013.01); *B65B 61/06* (2013.01); *B29C 65/18* (2013.01); *B29C 66/133* (2013.01); *B29C 66/4322* (2013.01); *B29C 66/71* (2013.01); *B29C 66/72941* (2013.01); *B29C 66/73115* (2013.01); *B29C 66/73921* (2013.01); *B29L 2031/7128* (2013.01); *B29L 2031/7414* (2013.01); *B65B 1/06* (2013.01); *B65B 29/00* (2013.01); *B65B 61/12* (2013.01); *B65B 2220/08* (2013.01)

(58) Field of Classification Search
CPC ............. B29C 66/0042; B29C 66/1122; B29C 66/4312; B29C 66/49; B29C 66/81413; B29C 66/81417; B29C 66/81419; B29C 66/83543; B29C 66/8491
USPC ........................................................ 156/73.1
See application file for complete search history.

(56) References Cited

U.S. PATENT DOCUMENTS

| 8,122,893 B2 | 2/2012 | Boldrini |
| 9,623,988 B2* | 4/2017 | Garthaffner ............... B65B 1/02 |
| 2007/0186941 A1 | 8/2007 | Holton, Jr. et al. |
| 2008/0029116 A1 | 2/2008 | Robinson et al. |
| 2010/0059069 A1 | 3/2010 | Boldrini |
| 2012/0067362 A1 | 3/2012 | Mola |
| 2013/0228288 A1 | 9/2013 | Ippers et al. |
| 2015/0068544 A1 | 3/2015 | Moldoveanu et al. |

FOREIGN PATENT DOCUMENTS

| WO | WO 2007/126361 | 11/2007 |
| WO | WO 2008/133563 | 11/2008 |
| WO | WO 2012/069505 | 5/2012 |
| WO | WO 2012/134380 | 10/2012 |
| WO | WO 2015/067372 | 5/2015 |
| WO | WO 2015/107484 | 7/2015 |

OTHER PUBLICATIONS

"Handbook of Nonwovens" by S. Russel, published by Woodhead Publ. Ltd., 2007.
Federal Register/ vol. 74, No. 4/712-719/Wednesday, Jan. 7, 2009/ Notices "Total moisture determination."
P. Gabbott, The Principles and Applications of Thermal Analysis, Wiley-Blackwell: London, 2007.
International Search Report for International Application No. PCT/EP2016/079592 dated Jan. 25, 2017.

* cited by examiner

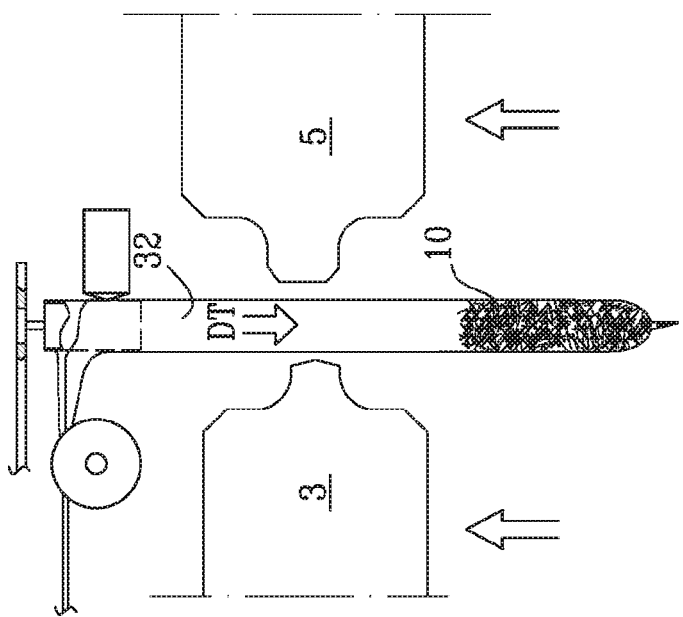
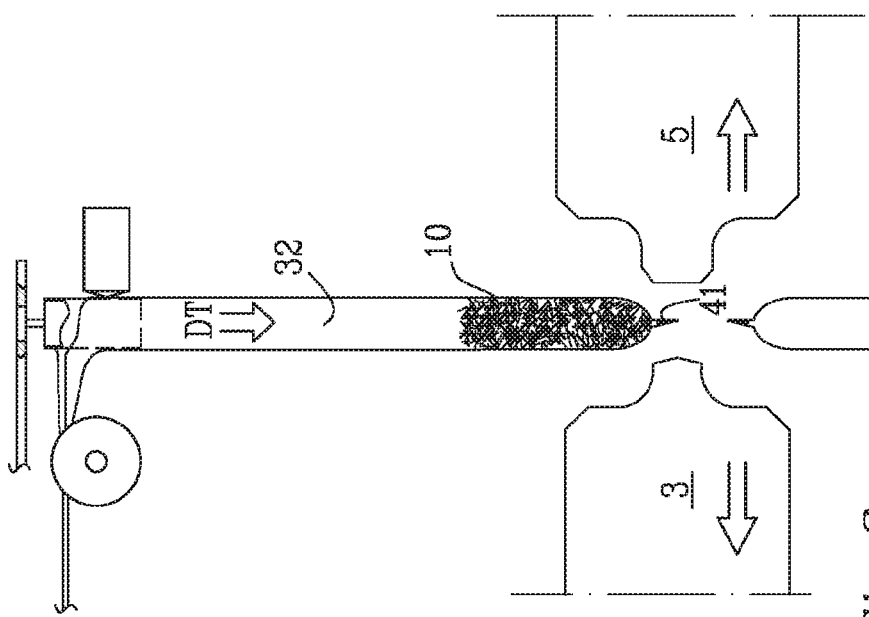

METHOD FOR PRODUCING AN ORAL POUCHED SNUFF PRODUCT

CROSS REFERENCE TO RELATED APPLICATIONS

This application is a continuation of U.S. application Ser. No. 15/760,410, filed Mar. 15, 2018, which is a U.S. National Phase Application of PCT International Application Number PCT/EP2016/079592, filed on Dec. 2, 2016, designating the United States of America and published in the English language, which is an International Application of and claims the benefit of priority to European Patent Application No. 15197533.1, filed on Dec. 2, 2015. The disclosures of the above-referenced applications are hereby expressly incorporated by reference in their entireties.

TECHNICAL FIELD

The present disclosure relates to a method for producing an oral pouched snuff product comprising a filling material and a saliva-permeable pouch enclosing the filling material, said product having a moisture content of at most 20% by weight based on total weight of the product, said saliva-permeable pouch having one or more seals, and said filling material comprising at least 20% by weight, based on dry weight of the filling material, of at least one ingredient having a melting temperature below 180° C. The present disclosure also provides an oral pouched snuff product obtainable by this method.

BACKGROUND

Smokeless tobacco for oral use includes chewing tobacco, dry snuff and moist (wet) snuff. Generally, dry snuff has a moisture content of less than 10 wt % and moist snuff has a moisture content of above 40 wt %. Semi-dry products having between 10% to 40 wt % moisture content are also available.

Smokeless tobacco products for oral use are made from tobacco leaves, such as lamina and stem of the tobacco leaf. The material from roots and stalks are normally not utilized for production of smokeless tobacco compositions for oral use.

There are two types of tobacco-containing moist snuff, the American type and the Scandinavian type which is also called snus. American-type moist snuff is commonly produced through a fermentation process. Scandinavian-type moist snuff is commonly produced by using a heat-treatment process (pasteurization) instead of fermentation. The heat-treatment is carried out in order to degrade, destroy or denature at least a portion of the microorganisms in the tobacco preparation.

Both the American-type and the Scandinavian-type of moist snuff for oral use are available in loose form or portion-packed in a saliva-permeable, porous wrapper material forming a pouch. Pouched moist snuff, including snus, is typically used by the user by placing the pouch between the upper or lower gum and the lip or cheek and retaining it there for a limited period of time. The pouch material holds the tobacco in place while allowing saliva to pass into the interior of the pouched product and allowing flavors and nicotine to diffuse from the tobacco material into the user's mouth.

There are also oral pouched nicotine-containing non-tobacco snuff products and oral pouched nicotine-free non-tobacco snuff products available which may be offered as alternatives to oral pouched smokeless tobacco products. These oral pouched non-tobacco snuff products are generally used in the same manner as the corresponding oral pouched tobacco-containing snuff products and are herein therefore also referred to as oral pouched snuff products.

Examples of oral pouched nicotine-containing non-tobacco snuff products and the manufacture thereof are provided in WO 2012/134380.

Examples of nicotine-free non-tobacco snuff products and the manufacture thereof are provided in WO 2007/126361 and WO 2008/133563.

Oral pouched snuff products, such as oral pouched tobacco-containing snuff products and oral pouched non-tobacco snuff products, may be produced by measuring portions of the filling material (snuff composition) and inserting the portions into a nonwoven tube.

U.S. Pat. No. 4,703,765 discloses a device for packaging precise amounts of finely divided tobacco, such as snuff tobacco or the like, in a tubular packaging material into which snuff portions are injected via a fill tube. Downstream from the tube, welding means are positioned for transverse sealing of the packaging material, and also cutting means for severing the packaging material in the area of the transverse seal to thus form discrete or individual portion packages.

EP 2428450 B1 relates to a snus dosing method, wherein a portion of tobacco is filled into a dosing chamber of a dosing device and then blown out of the dosing chamber by means of blow-out air to which water vapor has been added.

Oral pouched snuff products, such as tobacco-containing snuff products and non-tobacco snuff products, may alternatively be produced by placing portions of tobacco-containing or tobacco-free moist snuff composition on a nonwoven web using a pouch packer machine in accordance with the device disclosed in U.S. Pat. No. 6,135,120. This device comprises feeding means for feeding the snuff composition into pockets formed in a rotary portioning wheel for portioning the composition into portions, at least one compression means for compressing the snuff portions, a unit for advancing a packaging material, such as a nonwoven web, in synchrony with the compressed portions, at least one discharge means for discharging the portions from the pockets to the packaging material, and a forming unit for forming individual portion packages (such as pouched smokeless tobacco products) from the discharged portions and the packaging material. At the intended point of discharge of the portions of to the packaging material, said packaging material has the form of a tape, the compression means being arranged to compress the portions in a direction which differs from the discharging and the feeding directions. The compression is preferably effected in a direction perpendicular to the discharging and the feeding directions. The compression may be effected in the axial direction of the portioning wheel whereas the feeding and discharging may be effected in the radial direction of said wheel. This technique is herein referred to as the "NYPS" technique.

The packaging material forming the pouch in oral pouched snuff products is typically a dry-laid bonded nonwoven comprising viscose rayon fibres (i.e. regenerated cellulose) and an acrylic polymer that acts as binder in the nonwoven material and provides for heat-sealing of the pouches during manufacturing thereof. The viscose nonwoven normally used for pouched smokeless tobacco products is similar to the fabric used in tea bags. Nonwovens are fabrics that are neither woven nor knitted. Methods for the manufacturing of nonwoven materials are commonly known in the art. Further information on nonwovens is found in "Handbook of Nonwovens" by S. Russel, published by Woodhead Publ. Ltd., 2007.

The packaging material forming the pouch of the oral pouched snuff product should during manufacturing of the pouch provide for sealing, upon storage of the pouch exhibit none or a low degree of discoloration and upon usage by a consumer preserve integrity and strength, allow for a desired release profile of nicotine and flavors and provide a pleasant mouth-feel.

The organoleptic properties, such as texture, aroma, taste, shape and appearance, of the pouched snuff product, such as an oral pouched smokeless tobacco product, are of high importance to the user. It is generally desirable to provide oral pouched snuff products with rapid release of flavor and/or nicotine to provide an initial strong flavor experience and/or reduce nicotine craving.

Oral pouched snuff products are normally sized and configured to fit comfortably and discreetly in a user's mouth between the upper or lower gum and the lip. In general, oral pouched snuff products have a generally rectangular shape. Some typical shapes (length×width) of commercially available oral pouched snuff products are, for instance, 35 mm×20 mm, $^{34}/_{35}$ mm×14 mm, $^{33}/_{34}$ mm×18 mm, and $^{27}/_{28}$ mm×14 mm. The thickness ("height") of the pouched product is normally within the range of from 2 to 8 mm, such as from 5 to 7 mm. The total weight of commercially available oral pouched snuff products, such as an oral pouched smokeless tobacco product, are typically within the range from about 0.3 to about 3.5 g, such as from about 0.5 to 1.7 g, per pouched product.

The individual portioned-packed snuff products are sealed and cut apart thereby forming rectangular "pillow shaped" (or any other desired form) pouched products. Generally, each final pouched product includes parallel transverse seals at opposite ends and a longitudinal seal orthogonal to the transverse seals. The seals should be of sufficient strength to preserve the integrity of the pouched product during use while not disturbing the users experience. Heat melt-welding is commonly used today in the production of oral pouched snuff products to create the seals of the oral pouched snuff product. Heat melt-welding is generally performed by using welding apparatus heated to a temperature ranging from about 200° C. to 350° C.

U.S. Pat. No. 8,122,893 B2 discloses a machine for manufacturing pouches of a smokeless tobacco product. The machine comprises an intermittently rotatable dispensing disc with peripheral cavities, a station at which each cavity is filled with a given quantity of tobacco equivalent to a single portion, a push rod mechanism by which the portions of tobacco are ejected from each cavity of the disc at a transfer station, and a connecting duct through which the portion of tobacco ejected by the push rod from each cavity passes directly to a wrapping station where the pouches are formed, filled with the tobacco product and sealed. A rectilinear duct connects the transfer station with the wrapping station. The wrapping station comprises a tubular element positioned at the outlet end of the rectilinear duct, around which a tubular envelope of wrapping material is formed. The tubular envelope is sealed longitudinally by ultrasonic welders operating in dose proximity to the tubular element. The machine also comprises sealing means located beneath the tubular element, of which the function is to bond the tubular envelope transversely in such a manner as to form a continuous succession of pouches, each containing a relative portion of tobacco. Downstream of the transverse sealing means, the machine comprises a pair of transport belts looped around respective pulleys positioned to take up and direct the continuous succession of pouches toward cutting means by which the succession of pouches is divided up into single units.

Moreover, US 2012/0067362 A1 relates to a smokeless oral product comprising a permeable pouch of woven polylactide material which may be sealed by, for instance, a ultrasonic welding. These seams are disclosed to be smaller and more precise and therefore tidier and more visually appealing. They may also be more comfortable in the mouth of the user. Smaller seams have the further advantage that the required amount of woven material is reduced. However, apart from these advantages, ultrasonic welding and heat melt-welding are considered as equivalent welding techniques.

US 2010/059069 A1 relates to a machine for manufacturing individual bags or sachets of cohesionless material, such as pouches of snuff for oral use. The machine comprises an intermittently rotatable dispensing disc with peripheral cavities, a station at which each cavity is filled with a given quantity of tobacco equivalent to a single portion, a push rod mechanism by which the portions of tobacco are ejected from each cavity of the disc at a transfer station, and a connecting duct through which the portion of tobacco ejected by the push rod from each cavity passes directly to a wrapping station where the pouches are formed, filled with the tobacco product and sealed. The sealing may be performed using ultrasonic welders.

US 2008/029116 A1 relates to a smokeless tobacco product comprising a water-permeable pouch containing a tobacco formulation and an outer packaging material enveloping said pouch and being sealed so as to allow a controlled environment to be maintained within. An exemplary granulated tobacco formulation is disclosed to contain about 15 to about 30 parts mannitol powder and to have a moisture content of about 4 percent (see Example 2).

During manufacturing of some oral pouched snuff products, in particular during high-speed manufacturing, undesirable discoloration, such as slightly yellowish, brownish and/or dark spots, has been found on some products. These discolored pouched snuff products are usually disqualified for distribution to consumers. Thus, there is a need for a method for producing oral pouched snuff products which provides for reduced waste during pouch formation (i.e. during portion-packaging of snuff composition).

SUMMARY OF THE INVENTION

An object of the present disclosure is to alleviate at least the problem discussed above, and to provide advantages and aspects not provided by hitherto known technique.

It has now been found that the above-mentioned problem of discoloration of some oral pouched snuff products may occur when the product has a moisture content of at most 20% by weight, in particular at most 10% by weight, based on total weight of the product, and the filling material comprises at least 20% by weight, based on dry weight of the filling material, of at least one ingredient having a melting temperature below 180° C.

Some of these oral pouched snuff products may, alternatively or additionally, have an undesirable slightly burnt flavor.

It has now surprisingly been found that these problems are avoided or at least reduced when the seals of the oral pouched snuff products are created by ultrasonic welding instead of heat-melt welding. This means fewer disqualified oral pouched snuff products and thus less waste in the manufacturing thereof. This is particularly useful in high-speed manufacturing (in view of the portion-packing step) of oral pouched snuff products, such as at a production speed providing at least 100 pouched products per minute or at least 200 pouched products per minute.

Therefore, according to a first aspect of the present disclosure, there is provided a method for producing an oral pouched snuff product comprising a filling material and a saliva-permeable pouch enclosing the filling material, said product having a moisture content of at most 20% by weight based on total weight of the product, said saliva-permeable pouch having one or more seals, and the filling material comprising at least 20% by weight, based on dry weight of the filling material, of at least one ingredient having a melting temperature below 180° C., the method comprising supplying and advancing at least one web of packaging material, the at least one web of packaging material advancing in a direction of travel;

supplying the filling material to the at least one advancing web of packaging material; and welding and cutting the at least one advancing web of packaging material to which the filling material has been supplied to provide a plurality of pouches enclosing the filling material, wherein the welding of the at least one advancing web of packaging material to which the filling material has been supplied is provided by ultrasonic welding.

In particular, there is provided a method for producing an oral pouched snuff product comprising a filling material and a saliva-permeable pouch enclosing the filling material, said product having a moisture content of at most 20% by weight, in particular at most 10% by weight, based on total weight of the product, said saliva-permeable pouch having one or more seals, and the filling material comprising at least 20% by weight, based on dry weight of the filling material, of at least one ingredient having a melting temperature below 180° C., the method comprising supplying and advancing at least one web of packaging material, the at least one web of packaging material advancing in a direction of travel;

supplying the filling material to the at least one advancing web of packaging material;

forming the at least one advancing web of packaging material into an advancing tubular web, said forming being performed before or after supplying the filling material, thereby providing an advancing tubular web of packaging material containing the filling material; and welding and cutting the advancing tubular web of packaging material containing the filling material to provide a plurality of pouches enclosing the filling material, wherein the welding the tubular web of packaging material containing the filling material is provided by ultrasonic welding.

The ultrasonic welding and cutting may be performed simultaneously thereby providing a cut in a welded area.

In welding, materials are joined by fusing. The materials to be joined are melted in order to allow formation of a solid-state weld.

Melting occurs when the internal energy of a solid increases, typically by the application of heat or pressure. At the melting point the change in Gibbs free energy $\Delta G$ of the material is zero, but the enthalpy (H) and the entropy (S) of the material are increasing ($\Delta H$, $\Delta S$>0). Melting occurs when the Gibbs free energy of the liquid becomes lower than the solid for that material.

Ultrasonic welding causes local melting of the materials to be joined due to absorption of vibration energy. The vibrations are introduced across the joint to be welded. Generally, melting of the material to be sealed is caused by applying high frequency ultrasonic acoustic vibrations. Ultrasounds have frequencies higher than the upper audible limit of a human, which is about 20 kHz for a young adult.

Even though both heat melt-welding and ultrasonic welding cause melting of the pouch material, usually by melting the binder present in the pouch material, it has surprisingly been found that the problem with discoloration, such as formation of discolored spots, of the pouched product is avoided or at least reduced while using ultrasonic welding.

Furthermore, no burnt flavor is experienced by the consumer upon use of an oral pouched snuff product produced using ultrasonic welding.

A further advantage with the method as disclosed herein is that the machine operators do not risk burning themselves which often may occur when heat melt-welding is used for pouch formation.

Moreover, ultrasonic welding enables the formation of seals having a reduced seal width in comparison to seals formed by heat melt-welding.

In particular, simultaneous ultrasonic welding and cutting of the at least one advancing web of packaging material, to which the filling material has been supplied, may provide a cut in the welded area and may provide seals with a seal width equal to or less than 2 mm, such as within the range of from 0.1 mm to 2 mm or from 0.1 mm to 1 mm or from 0.1 mm to 0.5 mm.

Therefore, according to a second aspect of the present disclosure, there is provided an oral pouched snuff product comprising a filling material and a saliva-permeable pouch of a packaging material enclosing the filling material, the oral pouched snuff product having a moisture content of at most 20% by weight, in particular at most 10% by weight, based on the total weight of the product, the saliva-permeable pouch comprising at least one elongated seal sealing the packaging material and having a seal length extending along a first direction, the filling material comprising at least 20% by weight, based on dry weight of the filling material, of at least one ingredient having a melting temperature below 180° C., the at least one elongated seal having a seal width extending along a second direction transverse (orthogonal) to the first direction, the seal width being equal to or less than 2 mm, such as within the range of from 0.1 mm to 2 mm or from 0.1 mm to 1 mm or from 0.1 mm to 0.5 mm, and the at least one elongated seal being an ultrasonically provided weld formed by simultaneous ultrasonic welding and cutting of the packaging material such that a cut is provided in a welded area, thereby at least one outermost end portion of the pouch being sealed by the at least one elongated seal. This means that the pouch lacks protruding unsealed outermost end portions. In other words, the seal is coterminous with an end edge of the packaging material forming the pouch.

BRIEF DESCRIPTION OF THE DRAWINGS

FIG. 3a-g illustrate an arrangement which may be used for manufacturing portion-packed oral pouched snuff products in accordance with the method as disclosed herein.

DETAILED DESCRIPTION

Figure 1:
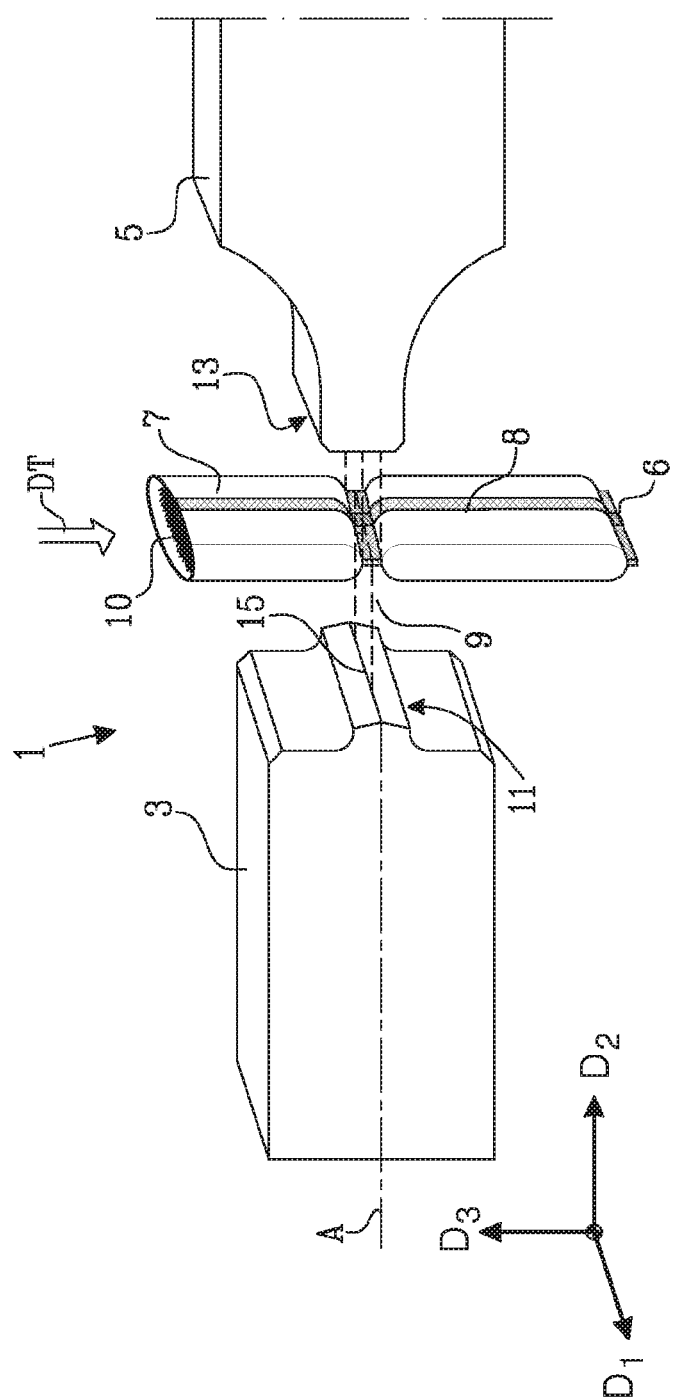
FIG. 1 illustrates a sealing device which may be used when performing the method as disclosed herein.

By "tobacco" as used herein is meant any part, e.g., leaves, stems, and stalks, of any member of the genus *Nicotiana*. The tobacco may be whole, shredded, threshed, cut, ground, cured, aged, fermented, or treated otherwise, e.g., granulated or encapsulated.

The term "tobacco material" is used herein for tobacco leaves or parts of leaves, such as lamina and stem. The leaves and parts of leaves may be finely divided (disintegrated), such as ground, cut, shredded or threshed, and the parts of leaves may be blended in defined proportions in the tobacco material.

"Oral" and "oral use" is in all contexts used herein as a description for use in the oral cavity of a human, such as buccal placement.

The term "oral pouched snuff products" as used herein includes oral pouched non-tobacco snuff products, which may be nicotine-containing or nicotine-free, as well as oral pouched tobacco-containing snuff products (also called oral pouched smokeless tobacco products).

As used herein the terms "pouched snuff product for oral use" or "oral pouched snuff product" refer to a portion of smokeless tobacco or tobacco-free filling material, which may be nicotine-containing or nicotine-free as described herein, packed in a saliva-permeable pouch material intended for oral use.

As used herein, the term "moisture content" refers to the total amount of oven volatile ingredients, such as water and other oven volatiles (e.g. propylene glycol) in the preparation, composition or product referred to. The moisture content is given herein as percent by weight (wt %) of the total weight of the preparation, composition or product referred to.

Some fibrous materials may exhibit hygroscopic properties. Hygroscopic materials maintain equilibrium moisture content depending on the ambient moisture and temperature.

The moisture content as referred to herein may be determined by using a method based on literature references Federal Register/vol. 74, no. 4/712-719/Wednesday, Jan. 7, 2009/Notices "Total moisture determination" and AOAC (Association of Official Analytical Chemics), Official Methods of Analysis 966.02: "Moisture in Tobacco" (1990), Fifth Edition, K. Helrich (ed). In this method, the moisture content is determined gravimetrically by taking 2.5±0.25 g sample and weighing the sample at ambient conditions, herein defined as being at a temperature of 22° C. and a relative humidity of 60%, before evaporation of moisture and after completion of dehydration. Mettler Toledo's Moisture Analyzer HB43, a balance with halogen heating technology, is used (Instead of an oven and a balance as in the mentioned literature references) in the experiments described herein. The sample is heated to 105° C. (instead of 99.5±0.5° C. as in the mentioned literature references). The measurement is stopped when the weight change is less than 1 mg during a 90 seconds time frame. The moisture content as weight percent of the sample is then calculated automatically by the Moisture Analyzer HB43.

The term "additional ingredient" as used herein denotes substances other than tobacco material, salt (e.g. sodium chloride, potassium chloride, magnesium chloride, calcium chloride and any combinations thereof), pH adjuster (e.g. sodium hydroxide, potassium hydroxide, potassium carbonate, sodium carbonate or sodium bicarbonate) and water.

"Flavour" or "flavouring agent" is used herein for a substance used to influence the aroma and/or taste of the snuff product, including, but not limited to, essential oils, single flavour compounds, compounded flavourings, and extracts.

As used herein "finely divided" means an average particle size of less than 2 mm. The particles of the finely divided tobacco material may be sized to pass through a screen of about 10 (US) mesh, i.e. sieve size 2.0 mm, or 18 (US) mesh, i.e. sieve size 1.0 mm.

As used herein "% w/w" or "wt %" or "weight %" refers to weight percent of the ingredient referred to of the total weight of the preparation, composition or product referred to.

As used herein, reference to "dry weight percent" refers to weight percent of the ingredient referred to on the basis of the total weight of dry ingredients. i.e. all ingredients of the preparation, composition or product referred to excluding moisture content.

As used herein, "melting temperature" or "melting point" are used interchangeably and refers to the temperature at which a solid changes state from solid to liquid at atmospheric pressure. At the melting point, the solid and liquid phases exist in equilibrium.

The melting temperature (melting point) of a solid may be measured by Differential Scanning Calorimetry (DSC) as is well known to persons skilled in the art. It is generally measured as the peak temperature of an endothermic event. Detailed information on DSC measurement may be found in P. Gabbott, The Principles and Applications of Thermal Analysis, Wiley-Blackwell: London, 2007.

As used herein, the term "seam" refers to those parts of the pouch material (packaging material) which are brought into contact with one another in order to form the pouch of the pouched product.

The seam further comprises a sealed portion, which is referred to as the seal of the pouched product. In case the outermost portion of the seam is unsealed, the seal is narrower in width than the seam. In case the entire region of the seam is sealed, the width of the seam and the seal is the same.

A lap seam/seal is formed by bringing an outer surface portion of the pouch material and an inner surface portion of the pouch material into a superposed relation.

A fin seam/seal is formed by bringing inner surface portions of the pouch material into a superposed relation.

A combined lap-and-fin seam/seal is formed by first bringing inner surface portions of the pouch material into a superposed relation, optionally sealing to form a fin seal, and then lap sealing the fin seam/seal to an outer surface portion of the pouch material.

In this context, "inner surface" of the pouch material refers to the surface of the pouch material that will form the interior of the final pouch, i.e. the side of the pouch material that will face the filling material enclosed in the pouch. "Outer surface" of the pouch material refers to the surface of the pouch material that will form the exterior of the final pouch.

As used herein, the "seal width" or "width of a seal" of a pouch refers to the maximum width of the sealed portion in the planar extension of the packaging material forming the pouch.

As used herein, the "seal length" or "length of a seal" of a pouch refers to the maximum length of the sealed portion in the planar extension of the packaging material forming the pouch.

Thus, an elongated seal has a seal length extending along the elongation of the seal and a seal width extending transverse (orthogonal) to the elongation of the seal.

The oral pouched snuff product of the method as disclosed herein may be an oral pouched smokeless tobacco product, an oral pouched non-tobacco (i.e. tobacco-free) nicotine-containing snuff product or an oral pouched non-tobacco (i.e. tobacco-free) nicotine-free snuff product.

The oral pouched snuff product of the method as disclosed herein are intended for use in the oral cavity, such as buccal placement (e.g. by placing the pouched product between the upper or lower gum and the lip or cheek), and may therefore be referred to as portion-packed (pouched) product for oral use. The oral pouched product is sized and configured to fit comfortably and discreetly in a user's mouth between the upper or lower gum and the lip or cheek.

The oral pouched product as disclosed herein may have an oblong shape, such as a substantially rectangular shape (as seen from above when the product is placed on a planar surface). In such case, the longitudinal direction of the product corresponds to the length of the substantially rectangular product and the transverse direction of the product corresponds to the width of the substantially rectangular product.

The total weight of the oral pouched product (including filling material and pouch) may be within the range of from 0.2 g to 2.0 g, such as within the range of from 0.3 g to 1.5 g or from 0.3 to 0.7 g.

The pouch of the oral pouched product may be made of any suitable saliva-permeable (and preferably non-dissolvable) pouch material, such as non-woven.

A binder may be included in the pouch material to facilitate sealing of the material by ultrasonic welding. The binder may be any suitable adhesive material, and suitable binders will be known to the skilled person. For example, thermoplastic binders based on polyacrylates can be used as suitable polymer binders.

The pouch material (herein also called packaging material) may be a nonwoven material comprising staple fibres of regenerated cellulose, such as viscose rayon staple fibres, and a binder, such as a polyacrylate.

The pouch material (herein also called packaging material) may be nonwoven comprising viscose rayon staple fibres and within the range of from 35% to 45% by weight, based on dry weight of the nonwoven, of a binder, such as a polyacrylate.

The pouch material may also comprise additional ingredients, such as flavouring agents and/or colorants.

Oral Pouched Smokeless Tobacco Products

In the method as disclosed herein, the oral pouched snuff product may be an oral pouched smokeless tobacco product having a moisture content of at most 20% by weight, in particular at most 10% by weight, based on the total weight of the product.

The oral pouched smokeless tobacco product, having a moisture content of at most 20% by weight or at most 10% by weight, based on the total weight of the product, may include a tobacco composition (as filling material) comprising divided (e.g. ground or cut) tobacco material, salt (e.g. sodium chloride, potassium chloride, magnesium chloride, calcium chloride or any combinations thereof), pH adjuster (e.g. sodium carbonate, sodium hydroxide, potassium hydroxide, potassium carbonate, sodium carbonate, sodium bicarbonate or magnesium carbonate) and optionally one or more additional ingredients, such as flavouring agents, cooling agents, heating agents, sweetening agents, colorants, humectants (e.g. glycerol or propylene glycol), antioxidants, preservatives (e.g. as potassium sorbate), binders, fillers, non-tobacco plant fibers and/or disintegration aids.

Typically, the amount of tobacco material in the smokeless tobacco composition is within the range of from about 50 to about 80% w/w based on dry weight of the smokeless tobacco composition. The tobacco material is typically finely divided, such as cut (shredded) or ground tobacco material, in granulated form or in powder form, i.e. tobacco flour, for instance having an average particle size of about 1 mm to about 2 mm. The tobacco material may be cured (aged) tobacco material. The tobacco material may be a bleached tobacco material.

Generally, cured and ground or cut tobacco material has moisture content within the range of from 3% to 15% w/w, such as within the range of from 3 to 10% w/w or 5% to 8% w/w. Generally, the pH of such finely divided tobacco material is within the range of from 4 to 6, such as within the range of from 4.5 to 6.

pH of divided tobacco material, such as tobacco flour, can be measured by adding 100 ml of distilled water to 5 gram of tobacco material, for instance in a 100 ml Erlenmeyer flask, stirring the resulting mixture at room temperature with a magnetic stirrer at 100 rpm for about 5 minutes, and then measuring the pH of an extract obtained therefrom with a calibrated (according to the manufacturer's instructions) pH meter. For correctness of readings, the sample solutions shall be analyzed within one hour.

Salt, such as sodium chloride, potassium chloride, magnesium chloride, calcium chloride and any combinations thereof, is added mainly for its effect on taste but it also has a preservative action which contributes to improved shelf life of the product. Salt, such as sodium chloride lowers the water activity of the products, thus preventing micro-organisms from growing. The natural occurrence of sodium chloride in tobacco material is normally below 2% w/w, typically below 1% w/w, based on dry weight of the tobacco material. Normally, the amount of added salt in the smokeless tobacco composition is within the range of from about 0.5 to about 10% w/w based on dry weight of the tobacco composition.

pH adjusters, such as sodium carbonate and/or sodium bicarbonate, are added to bring the pH value to the slightly alkaline side, such as about pH 7.5 to 8.5. Sodium carbonate may also be used to give the products their characteristic aroma profile. Typically, the amount of pH adjuster in the smokeless tobacco composition is less than about 7% w/w, such as within the range of from 3 to 5% w/w, based on dry weight of the tobacco composition.

Humectants, such as propylene glycol or glycerol, may also be added. Normally, the amount of humectant in the smokeless tobacco composition is within the range of from about 5 to about 10% w/w based on dry weight of the tobacco composition.

Flavours used are generally natural or nature identical compounds that comply with food regulations. Flavours may be dissolved in ethanol when added.

In addition, the smokeless tobacco composition may optionally comprise other botanical filling material as filler, such as any non-tobacco plant fiber. Examples of non-tobacco plant fibers are maize fibers, oat fibers, tomato fibers, barley fibers, rye fibers, sugar beet fibers, buck wheat fibers, potato fibers, apple fibers, cocoa fibers, bamboo fibers and citrus fibers. The amount of non-tobacco plant fiber material, such as bamboo fibers, in the smokeless tobacco composition may be within the range of from about 1 to about 60% w/w, such as from about 2 to about 20% w/w, based on dry weight of the smokeless tobacco composition.

Other fillers, which may be used to, for instance, increase the volume of the smokeless tobacco composition, may be microcrystalline cellulose, cellulose and other polysaccharides, cellulose derivatives, polyols, such as xylitol, maltitol, mannitol and sorbitol, and any combinations thereof.

Oral Pouched Non-Tobacco Nicotine-Free Snuff Products

In the method as disclosed herein, the oral pouched snuff product may be an oral pouched non-tobacco nicotine-free snuff product having a moisture content of at most 20% by weight, in particular at most 10% by weight, based on the total weight of the product.

The oral pouched non-tobacco nicotine-free snuff product, having a moisture content of at most 20% by weight or at most 10% by weight, based on the total weight of the product, may include a non-tobacco nicotine-free composition (as filling material) comprising divided non-tobacco plant material (e.g. in flour form), salt (e.g. sodium chloride, potassium chloride, magnesium chloride, calcium chloride and any combinations thereof), and optionally one or more additional ingredients, such as flavouring agents, cooling agents, heating agents, sweetening agents, colorants, humectants (e.g. propylene glycol or glycerol), antioxidants, preservatives (e.g. potassium sorbate), binders, fillers, and disintegration aids.

Typically, the amount of non-tobacco plant material in the nicotine-free non-tobacco snuff composition is within the range of from about 50 to 80% w/w based on dry weight of the composition.

Examples of non-tobacco plant fibres used in the non-tobacco plant material are dietary plant fibres, such as maize fibers, oat fibers, tomato fibers, barley fibers, rye fibers, sugar beet fibers, buck wheat fibers, potato fibers, apple fibers, cocoa fibers, bamboo fibers, citrus fibers and any combinations thereof.

The additional ingredients and the amounts thereof normally used are similar as described herein in relation to oral pouched smokeless tobacco products.

Examples of non-tobacco nicotine-free snuff products and their manufacturing are described in WO 2007/126361 and WO 2008/133563.

Oral Pouched Non-Tobacco Nicotine-Containing Snuff Products

In the method as disclosed herein, the oral pouched snuff product may be an oral pouched non-tobacco nicotine-containing snuff product having a moisture content of at most 20% by weight, in particular at most 10% by weight, based on the total weight of the product.

The oral pouched non-tobacco nicotine-containing snuff product, having a moisture content of at most 20% by weight or at most 10% by weight, based on the total weight of the product, may comprise a particulate material (as filling material) comprising nicotine or a salt thereof, such as nicotine bitartrate, and one or more fillers, such as polysaccharides (e.g. maltitol and mannitol) and/or microcrystalline cellulose.

Examples of oral pouched nicotine-containing non-tobacco snuff products and their manufacturing are described in WO 2012/134380.

The portion-packaging procedure (i.e. the formation of pouches enclosing the filling material) of oral pouched non-tobacco snuff products, which also may be referred to as oral smokeless non-tobacco snuff products, may be similar to the procedure of manufacturing oral pouched smokeless tobacco products except for that the tobacco material is replaced by a non-tobacco material (i.e. a tobacco-free material).

The oral pouched non-tobacco snuff products as disclosed herein are used in the same manner as the corresponding oral pouched tobacco snuff products. Oral pouched non-tobacco snuff products may also be used for the administration of drugs, as delivery systems intended for oral use and controlled release of biologically active substances.

The oral pouched snuff product may be packaged in a box, can, canister, cardboard box, bag, stick-pack wrapping, plastic wrapping, paper wrapping, foil wrapping, blister pack or on a tray.

The oral pouched (i.e. portion-packed) snuff products, produced in accordance with the method as disclosed herein, may be positioned randomly in a container or in a pattern, for instance as described in WO 2012/069505. Alternatively or additionally, each oral pouched snuff product may be placed in a sachet.

Filling Material and Ingredients Having a Melting Temperature Below 180° C.

The term "filling material" as used herein may also be referred to as filling composition or snuff composition.

Most oral pouched tobacco-containing snuff products as well as oral pouched non-tobacco snuff products contain carbohydrates.

Tobacco naturally contains sugars and curing of the tobacco may increase the sugar content as polysaccharides are broken down to sugar (mono- and disaccharides).

Oral pouched non-tobacco snuff products may comprise plant materials which normally contain carbohydrates, such as sugars and starch, and/or carbohydrate-containing fillers, such as maltitol and/or mannitol.

Oral tobacco snuff products as well as oral non-tobacco snuff products may also have carbohydrates added in the manufacturing process for improving the taste and/or texture of the product.

WO 2015/067372 discloses oral smokeless tobacco products and oral smokeless non-tobacco snuff products comprising xylitol in an amount of from 6 to 20% w/w of the final product. Xylitol is a sugar alcohol that may be used as a sugar substitute.

For instance, the non-tobacco nicotine-containing snuff products disclosed in WO 2012/134380 may comprise polyols, such as mannitol, maltitol and xylitol, monosaccharides, such as glucose and fructose, and disaccharides, such as maltose, as fillers and/or sweeteners. In the examples of WO 2012/134380, maltitol and/or mannitol are used in amounts above 40% by weight, based on the total weight of the compositions.

Examples of monosaccharides that may be used in oral pouched tobacco snuff products and oral pouched non-tobacco snuff products are glucose (also called dextrose) and fructose.

An example of disaccharides that may be used in oral pouched tobacco snuff products and oral pouched non-tobacco snuff products is maltose.

Examples of sugar alcohols that may be used in oral pouched tobacco snuff products and oral pouched non-tobacco snuff products are maltitol, mannitol, sorbitol, xylitol, erythritol, arabitol, ribotol, isomalt, dulcitol, iditol, and lactitol. Sugar alcohols are polyols derived from monosaccharides or disaccharides that have a partially or fully hydrogenated form.

Examples of other sweeteners which may be used in oral pouched tobacco snuff products and oral pouched non-tobacco snuff products are maltol and sucralose.

In Table 1, the approximate melting temperatures of some of these ingredients are presented (the values have been found in literature).

TABLE 1

| Ingredient | Melting temperature [° C.] |
|---|---|
| Maltitol | ~145-150 |
| Mannitol | ~168 |
| Sorbitol | ~111 |
| Xylitol | ~92-96 |
| Erythritol | ~121 |
| Arabitol | ~103 |
| Ribitol | ~102 |
| Isomalt | ~145-150 |
| Iditol | ~70-79 |
| Lactitol | ~146 |
| Glucose | ~146 |
| Fructose | ~103 |
| Maltose | ~160-165 |
| Maltol | ~161-162 |
| Sucralose | 125 |

In the method as disclosed herein, the oral pouched snuff product may have a moisture content of at most 20% by weight, such as within the range of from 0.1% to 20% by weight or 1% to 15% by weight, based on total weight of the product.

In the method as disclosed herein, the oral pouched snuff product may have a moisture content of at most 10% by weight, such as within the range of from 0.1% to 10% by weight or 1% to 10% by weight, based on total weight of the product.

In the method as disclosed herein, the oral pouched snuff product may have a moisture content of at most 5% by weight, such as within the range of from 0.1% to 5% by weight or 1% to 5% by weight, based on total weight of the product.

In the method as disclosed herein, the filling material of the oral pouched snuff product may comprise within the range of from 20% to 100% by weight, such as within the range of from 20% to 95% by weight or from 20% to 90% by weight or from 30% to 90% by weight or from 40% to 90% by weight, based on dry weight of the filling material, of at least one ingredient having a melting temperature below 180° C., such as a melting temperature of at most 175° C. or at most 170° C. or at most 165° C. or at most 160° C. or at most 155° C.

In the method as disclosed herein, the filling material of the oral pouched snuff product may comprise at least 25% by weight or at least 30% by weight or at least 35% by weight, based on dry weight of the filling material, of at least one ingredient having a melting temperature below 180° C., such as a melting temperature of at most 175° C. or at most 170° C. or at most 165° C. or at most 16000° C. or at most 155° C.

In the method as disclosed herein, the at least one ingredient may have a melting temperature within the range of from 70° C. to 175° C., such as within the range of from 70° C. to 165° C. or from 70° C. to 155° C. or from 90° C. to 155° C.

The at least one ingredient having a melting temperature below 180° C. may be at least partly crystalline.

In the method as disclosed herein, the at least one ingredient having a melting temperature below 180° C. may be selected from the group consisting of monosaccharides, disaccharides, sugar alcohols and any combinations thereof.

In the method as disclosed herein, the at least one ingredient having a melting temperature below 180° C. may be a sugar alcohol, such as maltitol, mannitol, sorbitol, xylitol and any combinations thereof.

In the method as disclosed herein, the at least one ingredient having a melting temperature below 180° C. may be a mono- or disaccharide, such as glucose, fructose, maltose and any combinations thereof.

In the method as disclosed herein, the oral pouched snuff product may be an oral pouched non-tobacco nicotine-containing snuff product and the filling material may comprise at least 25% by weight or at least 30% by weight or at least 35% by weight, such as within the range of from 40% to 90% by weight or from 45% to 80% or from 45% to 60% by weight, based on the total weight of the product, of at least one sugar alcohol having a melting temperature below 180° C., such as a melting temperature of at most 175° C. or at most 170° C. or at most 165° C. or at most 160° C. or at most 155° C.

In the method as disclosed herein, the oral pouched snuff product may be an oral pouched non-tobacco nicotine-containing snuff product and the filling material may comprise at least 25% by weight or at least 30% by weight or at least 35% by weight, such as within the range of from 40% to 90% by weight or from 45% to 80% or from 45% to 60% by weight, based on the total weight of the product, of at least one sugar alcohol selected from the group consisting of maltitol, mannitol and any combinations thereof.

In the method as disclosed herein, the oral pouched snuff product may be an oral pouched non-tobacco nicotine-containing snuff product and the filling material may comprise at least 25% by weight or at least 30% by weight or at least 35% by weight, such as within the range of from 40% to 90% by weight or from 45% to 80% or from 45% to 60% by weight, based on the total weight of the product, of maltitol.

As discussed above, ultrasonic welding may generate seals that are narrower in width (smaller) and more precise than seals created by heat melt-welding. Such seals are therefore generally tidier, more visually appealing and more discrete than seals created by heat melt-welding. They may also be more comfortable in the mouth of the user. Narrower seals have the further advantage that the amount of pouch material required may be reduced.

Thus, the method as disclosed herein may provide an oral pouched snuff having one or more ultrasonically provided seals with a seal width equal to or less than 2 mm, such as within the range of from 0.1 mm to 2 mm or from 0.1 mm to 1 mm or from 0.1 mm to 0.5 mm.

In the method as disclosed herein, the ultrasonic welding and the cutting of the web of packaging material to which the filling material has been supplied, for instance a tubular web of packaging material containing the filling material, may be performed simultaneously thereby providing a cut in a welded area. This means that the entire region of the seam(s) of the pouch will be sealed and the pouch will lack protruding unsealed outermost end portions. In other words, the seal will be coterminous with an end edge of the packaging material forming the pouch. Thus, at least one outermost end portion of the pouch is sealed by the at least one elongated seal.

There is, according to the present disclosure, also provided an oral pouched snuff product comprising a filling material and a saliva-permeable pouch of a packaging material enclosing the filling material, the oral pouched snuff product having a moisture content of at most 20% by weight, in particular at most 10% by weight, based on total weight of the product, the saliva-permeable pouch comprising at least one elongated seal having a seal length extending along a first direction, and the filling material comprising at least 20% by weight, based on dry weight of the filling material, of at least one ingredient having a melting temperature below 180° C., wherein the at least one elongated seal sealing the packaging material has a seal width extending along a second direction transverse (orthogonal) to the first direction, said width being equal to or less than 2 mm, such as within the range of from 0.1 mm to 2 mm or from 0.1 mm to 1 mm or from 0.1 mm to 0.5 mm, and the at least one elongated seal is an ultrasonically provided weld formed by simultaneous ultrasonic welding and cutting of the packaging material such that a cut is provided in a welded area, thereby at least one outermost end portion of the pouch is sealed by the at least one elongated seal.

It should be understood that features and advantages described herein in relation to the method of the present disclosure applies also to the oral pouched snuff product of the present disclosure.

The oral pouched snuff product, as disclosed herein, has a longitudinal direction and a transverse direction perpendicular to the longitudinal direction, the saliva-permeable pouch having at least one elongated seal having a seal length extending along the transverse direction of the product and a seal width extending along the longitudinal direction of the product, wherein said seal width being equal to or less than 2 mm, such as within the range of from 0.1 mm to 2 mm or from 0.1 mm to 1 mm or from 0.1 mm to 0.5 mm.

In particular, the oral pouched snuff product, as disclosed herein, may have a first elongated seal and a second elongated seal, each of said first and second elongated seals sealing an outermost end portion of the oral pouched snuff product, each of said first and second elongated seals has a seal length extending along the transverse direction of the product and a seal width extending along the longitudinal direction of the product, wherein said seal width being equal to or less than 2 mm, such as within the range of from 0.1 mm to 2 mm or from 0.1 mm to 1 mm or from 0.1 mm to 0.5 mm. The first elongated seal may seal a first outermost end portion of the pouch, and the second elongated seal may seal a second outermost end portion of the pouch. Thus, the first and second outermost end portions of the pouch are located at opposite peripheral sides of the oral pouched snuff product.

The pouch of the oral pouched snuff product, as disclosed herein, may additionally or alternatively comprise an additional elongated seal having a seal length extending along the longitudinal direction of the product and a seal width extending along the transverse direction of the product, wherein said seal width being equal to or less than 2 mm, such as within the range of from 0.1 mm to 2 mm or from 0.1 mm to 1 mm or from 0.1 mm to 0.5 mm.

The additional elongated seal of the oral pouched snuff product may be ultrasonically provided weld.

The filling material of the oral pouched snuff product, as disclosed herein, may comprise within the range of from 20% to 100% by weight, such as within the range of from 20% to 95% by weight or from 20% to 90% by weight or 30 to 90% by weight or from 40% to 90% by weight, based on dry weight of the filling material, of the at least one ingredient having a melting temperature below 180° C.

The moisture content of the oral pouched snuff product, as disclosed herein, may be at most 5% by weight, such as within the range of from 0.1 to 5% by weight, based on total weight of the product.

The least one ingredient having a melting temperature below 180° C. contained in the filling material of the oral pouched snuff product as disclosed herein may be selected from the group consisting of monosaccharides, disaccharides, sugar alcohols and any combinations thereof.

The filling material of the oral pouched snuff product as disclosed herein may comprise a sugar alcohol having a melting temperature below 180° C., such as maltitol, mannitol, sorbitol and/or xylitol.

The filling material of the oral pouched snuff product as disclosed herein may comprise a mono- or disaccharide having a melting temperature below 180° C., such as glucose, fructose, maltose and any combinations thereof.

The oral pouched snuff product may be an oral pouched non-tobacco nicotine-containing snuff product and the filling material may comprise at least 35% by weight, such as within the range of from 40% to 90% by weight or from 45% to 80% or from 45% to 60% by weight, based on the total weight of the product, of at least one sugar alcohol having a melting temperature below 180° C.

The oral pouched snuff product may be an oral pouched non-tobacco nicotine-containing snuff product and the filling material may comprise at least 35% by weight, such as within the range of from 40% to 90% by weight or from 45% to 80% or from 45% to 60% by weight, based on the total weight of the product, of at least one sugar alcohol selected from the group consisting of maltitol, mannitol and any combinations thereof.

The oral pouched snuff product may be an oral pouched non-tobacco nicotine-containing snuff product and the filling material may comprise at least 35% by weight, such as within the range of from 40% to 90% by weight or from 45% to 80% or from 45% to 60% by weight, based on the total weight of the product, of maltitol.

As described above, the method as disclosed herein may comprise forming an advancing web of packaging material into an advancing tubular web, the forming being performed before or after supplying the filling material, thereby providing an advancing tubular web containing the filling material; and welding and cutting the advancing tubular web of packaging material containing the filling material to provide a plurality of pouches enclosing the filling material, wherein the welding of said tubular web of packaging material containing the filling material is provided by ultrasonic welding.

In order to avoid discoloration of the oral pouched snuff product as disclosed herein, welding of the tubular web after the filling material (comprising the at least one ingredient having a melting temperature below 180° C.) may be performed by ultrasonic welding.

However, in case the advancing tubular web of packaging material is formed before supplying the filling material, a longitudinal seal extending along the direction of travel of the tubular web may be provided by heat melt-welding without any risk of discoloration of the product.

Figure 2:
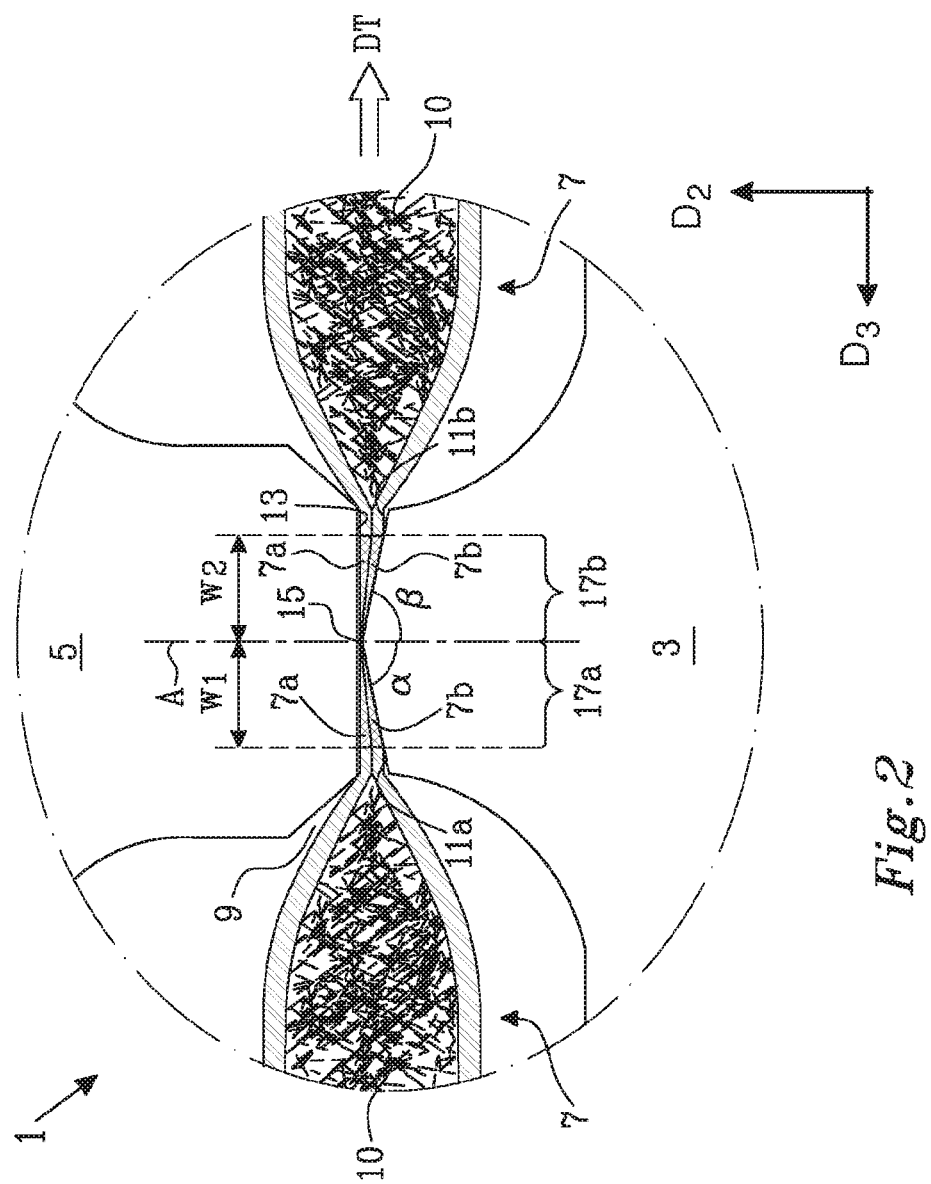
FIG. 2 is a detailed cross-sectional view showing the sealing device in operation.

FIGS. 1 and 2 illustrate a sealing device 1 for sealing a packaging material enclosing a snuff composition to provide portion-packed oral pouched snuff products using the method as disclosed herein.

The sealing device 1 comprises an anvil 3 and a sonotrode 5, which is arranged opposite to the anvil 3 to allow passage of the packaging material 7 in a gap 9 formed between the sonotrode 5 and the anvil 3. The sonotrode 5 is adapted for transmitting ultra-sonic energy. In the illustrated embodiment of FIG. 1, a portion 10 of filling material has already been enclosed by the packaging material 7 before reaching the sealing device 1. A portion-packed oral pouched snuff product comprises the portion 10 of the filling material and a piece of the packaging material 7, the packaging material 7 enclosing the portion 10 of the snuff composition.

The anvil 3 and the sonotrode 5 are configured for simultaneous welding and cutting of the packaging material 7. The welding operation is utilized to provide the pouched snuff product with one or more seals, which may be longitudinal seals and/or transverse seals. The cutting operation is utilized to cut the packaging material 7, e.g. to separate two consecutive pouched products from each other or to separate superfluous packaging material from a longitudinal seal.

The packaging material 7 is adapted to advance in a direction of travel DT through the gap 9. The orientation of the direction of travel DT in relation to the orientation of the sonotrode 5 and the anvil 3 depends on whether a longitudinal or transverse seal is to be formed. For a longitudinal seal, the direction of travel would be out of the paper in FIG. 1. For providing a transverse seal 6, as is illustrated in FIG. 1, the direction of travel DT is downwards in FIG. 1.

The packaging material 7 is formed to a tubular web, which may comprise a longitudinal seal 8. At the desired location of the transverse seal 6, there is no filling material. Instead a first portion 7a of the packaging material 7 directly faces a second portion 7b of the packaging material 7. These two portions 7a, 7b are to be welded together in the transverse seal 6.

The anvil 3 comprises a first operation surface 11 and the sonotrode 5 comprises a second operation surface 13, which is located opposite to the first operation surface 11. The first operation surface 11 of the anvil 3 comprises a first welding surface 11a and a second welding surface 11b. A cutting edge 15 delimits the first welding surface 11a and the second welding surface 11b from each other. The cutting edge 15 is located at a portion of the first operation surface 11 being adjacent to the narrowest portion of the gap 9. The cutting edge 15 is adapted to cut through the packaging material 7. In the illustrated embodiment, the cutting edge 15 is adapted to cut through the first and second portions 7a, 7b of the packing material 7. The second operation surface 13 is non-angled, i.e. flat. The direction of travel DT is substantially parallel to the non-angled operation surface 13 of the sonotrode 5. The first and second welding surfaces 11a, 11b provide the welding, and the cutting edge 15 provides the cutting. Thus, ultrasonic welding and cutting are performed simultaneously thereby providing a cut in a welded area. With the sealing device 1, the cut is placed in the welded area, i.e. there are no non-welded portions adjacent to the cut. In other words, the seal will be coterminous with the cut edge (end edge) of the packaging material. The cutting and welding is thereby made simultaneously in time, in the same operation step and next to each other.

The extension direction of the cutting edge 15 defines a first direction $D_1$ of the anvil 3. A main direction A of the anvil 3 defines a second direction $D_2$, which is perpendicular to the first direction $D_1$. A third direction $D_3$ is perpendicular to both the first direction $D_1$ and to the second direction $D_2$. Since FIGS. 1 and 2 illustrates providing the transverse seal 6, the first direction $D_1$ substantially coincides with a transverse direction of the packing material 7 and the third direction $D_3$ coincides with the direction of travel DT of packaging material 7 but pointing in the opposite direction.

The first welding surface 11a defines a first extension plane. In the illustrated exemplary device, the first welding surface 11a constitutes an inclined planar surface, such that the first extension plane is defined by the inclined planar surface. In case, the first welding surface 11a does not form a planar surface, e.g. by having a curved surface, the first extension plane is defined as a mean plane to the first welding surface 11a, i.e. the plane having the least squared distance from the first welding surface 11a to that plane.

The first extension plane assumes an angle $\alpha$ being between 70° and 90° in relation to the main direction A of the anvil 3, being parallel to the second direction $D_2$, preferably the angle $\alpha$ being in the range from 72° to 89°, more preferably from 75° to 88°, most preferably from 80° to 85°. In the illustrated exemplary device the angle $\alpha$ is substantially 82°.

The second welding surface 11b defines a second extension plane. In the illustrated exemplary device, the second welding surface 11b constitutes an inclined planar surface, such that the second extension plane is defined by the inclined planar surface. The orientation of the second extension plane differs from that of that the first extension plane. The second extension plane assumes an angle $\beta$ being between 70° and 90° in relation to the main direction A of the anvil 3, preferably the angle $\beta$ being in the range from 72° to 89°, more preferably from 75° to 88°, most preferably from 80° to 85°. In the illustrated embodiment, the angle $\beta$ is substantially 82°. Hence, the angles $\alpha$, $\beta$ of the first and second welding surfaces 11a, 11b are of equal size but different orientation in the illustrated exemplary device of FIGS. 1 and 2. However, also their sizes may differ.

As mentioned above, the second operation surface 13 is non-angled. It thus assumes an angle of 90° in relation to the second direction $D_2$.

The cutting edge 15 delimits one side of the first welding surface 11a and the corresponding side of the second welding surface 11b. When viewed in along the main direction A, the first welding surface 11a and the second welding surface 11b form a rectangular region. One side of the rectangles is delimited by the cutting edge 15. The cutting edge 15 thus separates the first welding surface 11a from the second welding surface 11b. Yet the two welding surfaces 11a, 11b extend all the way to the cutting edge 15, such that there is no interspace between the weld and the cut, i.e. there are no non-welded portions adjacent to the cut.

The first welding surface 11a comprises a first welding zone 17a delimited at one side by the cutting edge 15, and the second welding surface 11b comprises a second welding zone 17b also delimited at one side by the cutting edge 15. In the first and second welding zones 17a, 17b, the anvil 3 and the sonotrode 5 are close enough to be able to melt the first and second portions 7a, 7b of the packaging material and thereby join them by welding. The widths $w_1$, $w_2$ of the first and second welding zones 17a, 17b in the third direction $D_3$ depend on characteristics of the sealing device 1, the packaging material 7 and their interaction. Examples of device characteristics are angles of the operation surfaces 11, 13 relative to each other, distance between the operation surfaces 11, 13, material properties of the anvil 3 and the sonotrode 5, frequency and energy of the ultra sound of the sonotrode 5. Examples of packaging material characteristics are type of material, melting point, thickness, surface roughness. In the illustrated exemplary device, the first and second welding zones 17a, 17b have the same widths $w_1$, $w_2$, but the widths $w_1$, $w_2$ may also differ. Further, the width $w_1$ of the first welding zone 17a may be the same as for the first operation surface 11 and/or the width $w_2$ of the second welding zone 17b may be the same as for the second operation surface 13. However, typically the welding zone is narrower than the operation surface, i.e. the width of the weld is less than the width of the gap 9 as seen along the direction of travel DT.

By using the exemplary sealing device, the packaging material 7 is welded on both sides of the cutting edge 15. This configuration could suitably be used for a transverse seal 6, as is illustrated in FIGS. 1 and 2, wherein the cut performed by the cutting edge is utilized to separate individual pouched products and for which there is a desire that both ends of the individual pouched products should be adequately sealed. The direction of travel DT would thus be parallel to the non-angles second operation surface 13 but substantially perpendicular to the extension direction of the cutting edge 15, see FIGS. 1 and 2. For such a transverse seal 6, it may be advantageous that the angles α, β of the extension planes are of the same size and the first and second welding zones 17a, 17b have the same widths $w_1$, $w_2$.

A sealing device like the one illustrated in FIGS. 1 and 2 would also be suitable for making a longitudinal seal. The direction of travel would then be in the first direction $D_1$, i.e. parallel to the extension direction of the cutting edge 15, i.e. out of the paper in FIG. 2. In that case, parts of the packaging material 7 being outside the cut, which parts are to be removed e.g. as strips, are joined to each other. The combined strip will be stronger than the individual strips and will thus better withstand a pulling force, such that it is less likely to be torn off.

FIGS. 3a-g illustrate an arrangement 19 useful for manufacturing portion-packed oral pouched snuff products 43 in accordance with the method as disclosed herein. The arrangement 19 comprises a first feeding unit 23 for supplying a planar web 25 of the packaging material 7, a second feeding unit 27 for supplying a filling material 29 to the advancing web 25, a forming unit 31 for forming a tubular web 32 of the planar web 25 of the packaging material 7, a device 33 for making a longitudinal seal and a device for making a transverse seal, illustrated as the sealing device 1 of FIGS. 1 and 2.

The second feeding unit 27 may be located downstream or upstream of the forming unit 31. If placed downstream, the web 25 is first formed to a tubular web 32 and thereafter the filling material 29 is placed in the tubular web 32 as a portion 10, as for the arrangement 19 illustrated in FIGS. 3a-g. Alternatively, the filling material 29 may be placed on the planar web 25 as a portion 10 before the planar web 25 is formed to a tubular web, such that the packaging material 7 is arranged around the snuff portion to form the tubular web, thereby enclosing the snuff portion 10.

At least one of the devices for making a longitudinal seal and the device for making a transverse seam may utilize ultra-sound to perform simultaneous welding and cutting, e.g. by the device as described in conjunction with FIGS. 1-2, in order to obtain a seal. Hence, in the arrangement 19, welding and cutting is performed simultaneously and in the same operation step for at least one of the seals.

In the illustrated embodiment of FIGS. 3a-g, the transverse seal 6 is formed by a device like the one described in conjunction with FIGS. 1 and 2. The sonotrode 5 and the anvil 3 are arranged to be displaced in a reciprocating way in relation to the tubular web 32 in the second direction $D_2$, between a first position, illustrated in FIG. 3a, being in contact with the tubular web 32 and a position, illustrated in FIG. 3c, being out of contact with the tubular web 32.

Figure 3B:
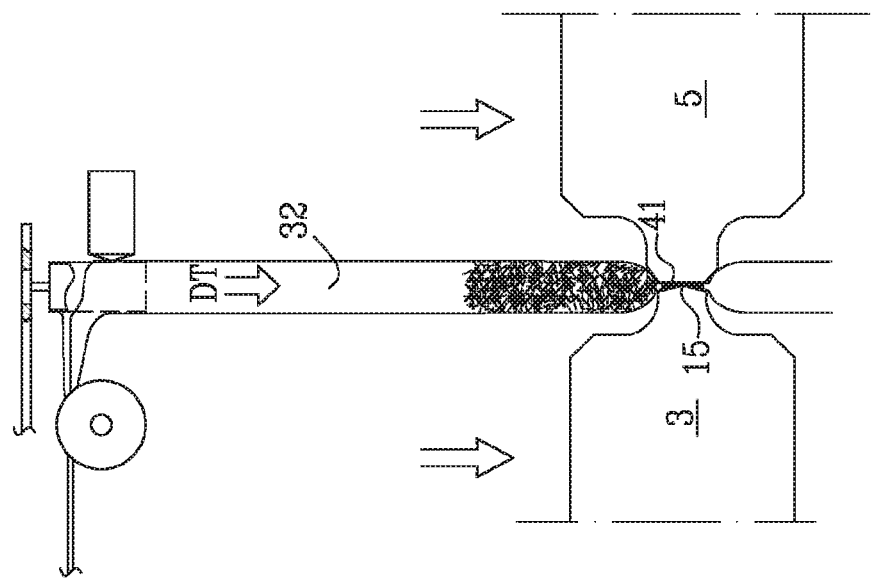

Further, the sonotrode 5 and the anvil 3 are adapted to follow the tubular web 32 when moving in the direction of travel DT, i.e. in a direction opposite to the third direction $D_3$, while performing the simultaneous welding and cutting, in order to be able to follow the tubular web 32 to a downstream position, illustrated in FIG. 3b.

The anvil 3 moves along a path 37 which has a first portion 37a parallel to and adjacent to the tubular web 32, a second portion 37b moving the anvil 3 away from the tubular web 32, a third portion 37c bringing the anvil 3 back upstream and a fourth portion 37d bringing the anvil 3 back into contact with the tubular web 32. The sonotrode 5 follows a corresponding path 39, having corresponding portions 39a, 39b, 39c, 39d. See paths 37, 39 illustrated in FIG. 3a. The paths 37, 39 are further described below.

Figure 3A:
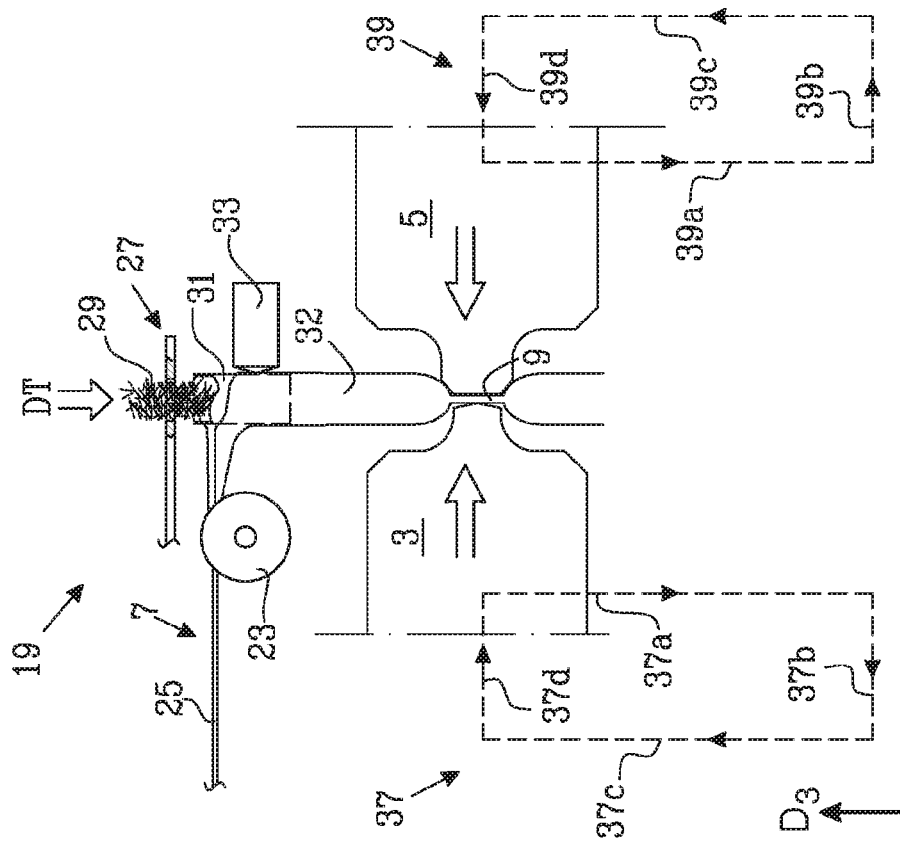

FIG. 3a illustrates a start of the method. A longitudinal seal, e.g. like the longitudinal seal 8 illustrated in FIG. 1, is continuously formed in the advancing tubular web 32 by the device 33 for making a longitudinal seal. The anvil 3 and the sonotrode 5 assume the first position, in which they start welding. A portion 10 of the filling material 29 is filled from above into the tubular web 32. The filling material moves downwards by gravity until it reaches the portion of the tubular web 32, which is in the gap 9 between the anvil 3 and the sonotrode 5.

The anvil 3 and the sonotrode 5 move downstream together with the tubular web 32 while performing the welding along the respective first portions 37a, 39a of their paths. The anvil 3 and the sonotrode 5 have then reach a second position being downstream of the first position but yet in contact with the tubular web 32. See FIG. 3b. The tubular web 32 is cut by the cutting edge 15 leaving a transverse seal 41.

Thereafter the anvil 3 and the sonotrode 5 are moved away from the tubular web 32 along the second portions 37b, 39b of their respective paths until they reach a respective third position, such that they are no longer in contact. The already formed transverse seal 41 prevents the portion 10 of the filling material from falling out; see FIG. 3c.

As a next step, the anvil 3 and the sonotrode 5 are moved back upstream along the third portions 37c, 39c of their respective paths to a fourth position being out of contact with the tubular web 32; see FIG. 3d.

Figure 3F:
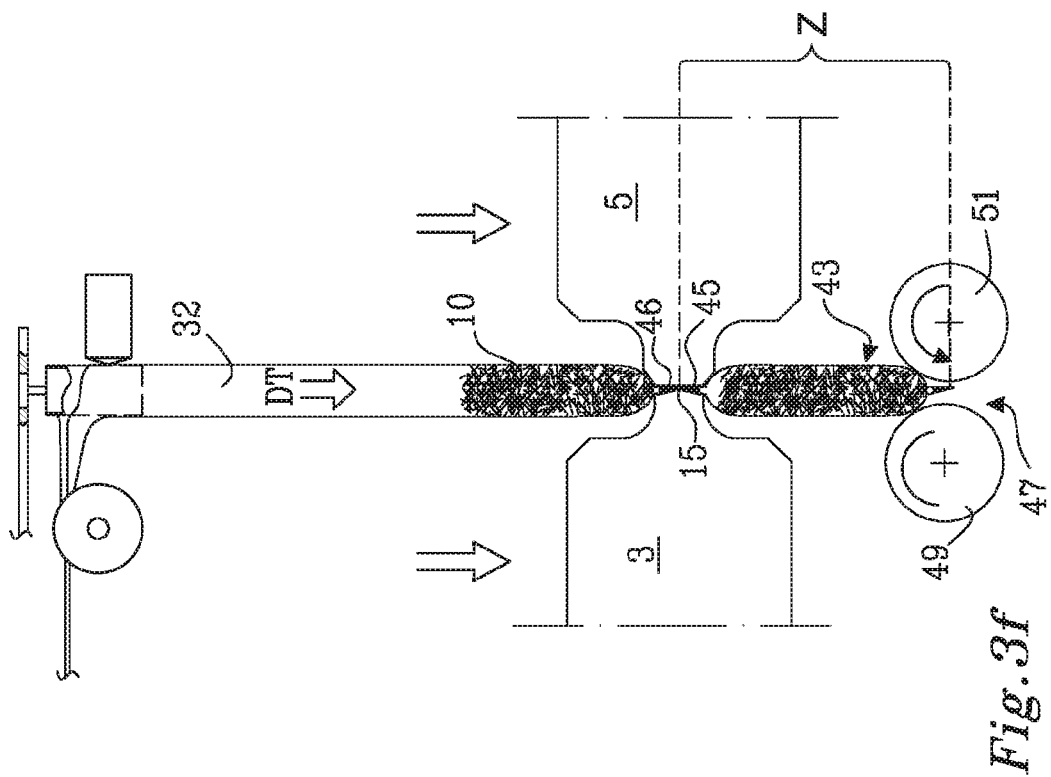
Figure 3E:
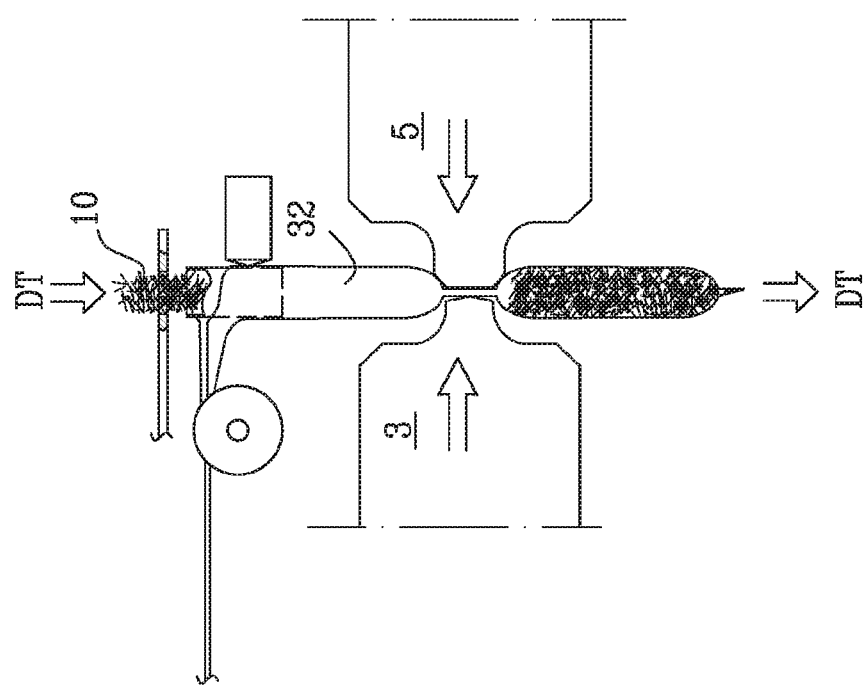

Then the anvil 3 and the sonotrode 5 are moved back to the first position along the fourth portions 37d, 39d of their respective paths, such that they start forming a new transverse seal 45; see FIG. 3e.

The anvil 3 and the sonotrode 5 move along the respective first portions 37a, 39a of their paths together with the tubular web 32 while performing the welding until the anvil 3 and the sonotrode 5 reach the second position being downstream of the first position but yet in contact with the tubular web 32; see FIG. 3f. The tubular web 32 is cut by the cutting edge 15, leaving a transverse seal 45 at the upper edge of the pouched product 43 and a corresponding transverse seal 46 at the lower edge of the next pouched product, which has been filled by a next portion 10 of the filling material.

Figure 3G:
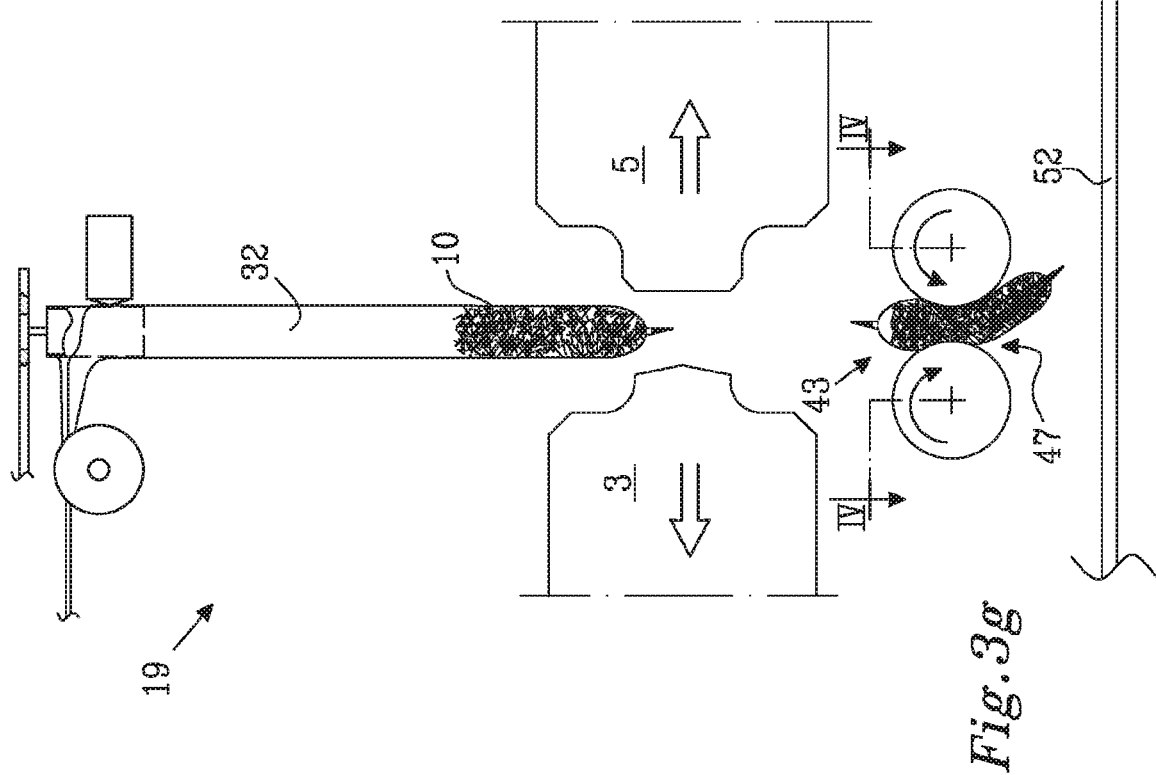

Thereafter the anvil 3 and the sonotrode 5 are moved away from the tubular web 32 along the second portions 37b, 39b of their respective paths until they reach a respective third position, illustrated in FIG. 3g, such that they are no longer in contact, as is already described above for FIG. 3c. The anvil 3 and the sonotrode 5 continue to move along their paths 37, 39 described above, while the tubular web 35 moves in the direction of travel DT.

In order to help separating the tubular web 32 in the cut, the arrangement 19 may further comprise a pulling unit, illustrated in FIG. 3f as a nip 47 between a pair of rollers 49, 51 arranged to pull the pouched product 43 in the direction of travel DT. Thereby the tubular web 32 is tensioned in a controllable way in order to make a separation of the pouched product 43 from the next pouched product easier. The distance z between the nip 47 and the cutting edge 15 when the sealing device is in the second position, see FIG. 3f, roughly corresponds to the extension of the pouched product 43 in the direction of travel DT. Hence, if the arrangement 19 is utilized for manufacturing portion-packed oral pouched snuff products of different sizes, the distance z is preferably adjustable. After passing the nip 47, the pouched product 43 is placed on a conveyer 52.

Figure 4:
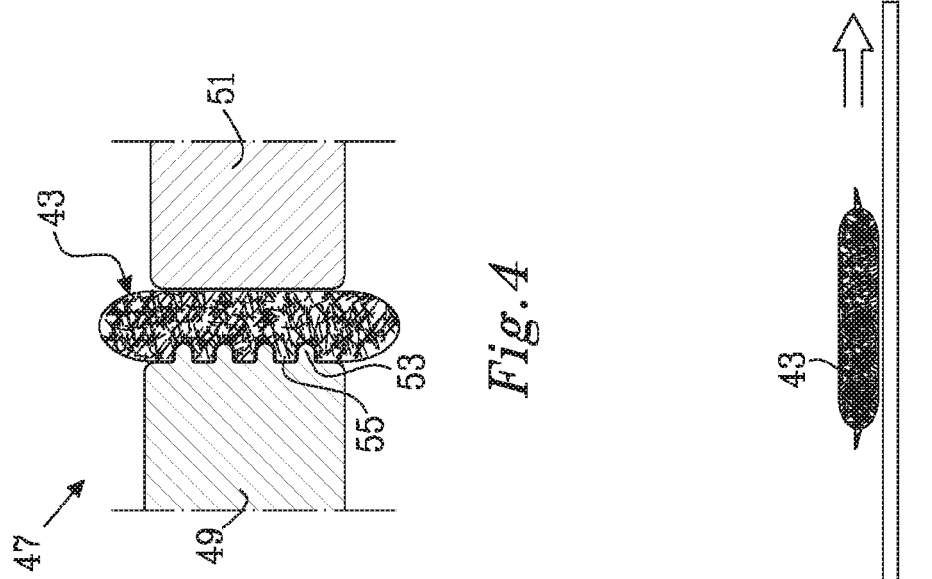
FIG. 4 illustrates a cross-section through a nip of a pulling unit.

FIG. 4 illustrates a cross-section through the nip 47 as seen from above in FIG. 3g. In order to be able to pull the pouched product 43 filled with the portion 10 of the filling material without destroying the pouched product 43 in the nip 47, at least one of the rolls, illustrated as the left-hand roll 49, is provided with a plurality of ridges 53, having interspaces 55 between the ridges 53. The ridges 53 will help to pull the pouched product 43, while the interspaces 55 give room for the filling material. Thereby, it is possible to pull the pouched product 43 through the nip 47 without destroying it. There are at least two ridges 53. The other roll 51 may be flat as is illustrated or it may also comprises ridges.

The longitudinal seal, e.g. like the longitudinal seal 8 illustrated in FIG. 1, may be performed by heat sealing in the device 33 for making a longitudinal seal.

The characteristics of the cut and weld performed by the sealing device as described herein depend on characteristics of the sealing device and of the packaging material and their interaction. Examples of device characteristics are angles of the operation surfaces relative to each other, distance between the operation surfaces, material properties of the anvil and the sonotrode, frequency and energy of the ultra sound of the sonotrode. Examples of packaging material characteristics are type of material, melting point, thickness, surface roughness. Examples of interaction characteristics are gap width in relation to thickness of packaging material and pressure used by the anvil and the sonotrode during cutting and welding.

The invention will now be illustrated by means of the following non-limiting examples wherein an arrangement as described above in FIG. 3a-3g were used for portion-packing a filling material and thereby providing oral pouched snuff products. The frequency used for the sonotrode in the sealing device as described herein may be in the range of from 20 kHz to 45 kHz, e.g. 20 kHz, 35 kHz or 40 kHz. The effect may be in the range of from 100 Watt to 300 Watt. The frequency and the effect are suitably adapted to the material to be welded, and may thus vary for different packaging materials.

EXAMPLES

In all reference examples and examples, the pouch material was a dry-laid (carded) bonded nonwoven comprising viscose staple fibres and about 35-45% by weight, based on the total dry weight of the nonwoven, of an acrylic polymer that acts as binder in the nonwoven material.

Reference Example 1: 20% and 35% by Weight of Galactitol in Heat Melt-Welded Pouches Two batches of powder mixture including galactitol (Dulcitol, 99+%, ACROS Organics™, supplied by Fisher Scientific) and microcrystalline cellulose, MCC (Avicel PH-200, supplied by FMC Biopolymer) were prepared, according to Table 1, using a Kenwood mixer Titanium Major. The mixing time was 12 minutes and the mixing speed was set at minimum speed. To assure homogenous mixture and avoid dead zones the product in the bottom of the bowl was manually mixed using a spoon after 3, 7 and 10 minutes of mixing.

Dulcitol, 99+%, ACROS Organics™ has according to the supplier's product information, a melting point of about 185-190° C. and contains at least 99% galactitol.

Avicel PH-200 has, according to the supplier's product information, a nominal particle size of 180 µm, a loose bulk density of 0.29-0.36 g/cc and a moisture content of ≤5%.

TABLE 1

| Batch | Amount of galactitol (g) | Amount of MCC (g) | Percentage of galactitol (% by weight) |
|---|---|---|---|
| Ref 1.1 | 400 | 1600 | 20 |
| Ref 1.2 | 525 | 975 | 35 |

The two batches of powder mix were packed in pouches using a Merz SB 53-2/T packer with pressured air powder dosing of the powder mixture into an advancing tubular web of pouch material. Sealing of the tubular web along the direction of travel as well as transverse to the direction of travel were made by heat melt-welding. The temperature of the welding parts was about 300° C. and the pouch packing speed was 200 pouches per minute.

The moisture content of the product was below 5% by weight based on the total weight of the product.

50 samples of packed pouches were taken every minute and analysed for frequency of stained/discolored pouches during 10 minutes. The results of the analyses are shown in Table 2.

TABLE 2

| Batch | 1 min | 2 min | 3 min | 4 min | 7 min | 8 min | 9 min | 10 min |
|---|---|---|---|---|---|---|---|---|
| Ref 1.1 | 0/50 | 0/50 | 0/50 | 0/50 | 0/50 | 0/50 | 1/50 | 1/50 |
| Ref 1.2 | 0/50 | 0/50 | 0/50 | 0/50 | 0/50 | 0/50 | 0/50 | 0/50 |

Figure 5:
FIG. 5-9 are photographs showing deposition of filling material on the heat melt-welding apparatus when oral pouched snuff products in accordance with Reference Examples 1-3 were produced.
Figure 6:

FIG. 5 shows the welding apparatus for batch ref. 1.1 after about 10 minutes. FIG. 6 shows the welding apparatus for batch ref. 1.2 after about 10 minutes.

This example illustrates that no significant discoloration occur in the manufacture of oral pouched snuff products by heat melt-welding when the filling material comprises about 20-35% by weight, based on the dry weight of the filling material, of an ingredient having a melting temperature of about 185-190° C.

Reference Example 2: 20%, 35% and 50% by Weight of Maltitol in Heat Melt-Welded Pouches Three batches of powder mixture including crystalline maltitol (Maltidex™ CH 16385, supplied by Cargill) and microcrystalline cellulose, MCC (Avicel PH-200, supplied by FMC Biopolymer), were prepared, according to Table 3, using a Dinnissen Pegasus PG-10(VC) lab mixer. The mixing time was 2 minutes and the mixing speed was 70 Hz.

Maltidex™ CH 16385 has, according to the supplier's product information, a melting point of about 150° C. and contains at least 99% maltitol.

TABLE 3

| Batch | Amount of maltitol (g) | Amount of MCC (g) | Percentage of maltitol (% by weight) |
|---|---|---|---|
| Ref 2.1 | 1000 | 4000 | 20 |
| Ref 2.2 | 1750 | 3250 | 35 |
| Ref 2.3 | 2500 | 2500 | 50 |

The three batches of powder mixture were packed in pouches using a Merz SB 53-2/T packer with pressured air powder dosing of the powder mixture into an advancing tubular web of pouch material. Sealing of the tubular web along the direction of travel as well as transverse to the direction of travel were made by heat melt-welding. The temperature of the welding parts was about 300° C. and the pouch packing speed was 200 pouches per minute.

The moisture content of the product was below 5% by weight based on the total weight of the product.

50 samples of packed pouches were taken every minute and analysed for frequency of stained/discolored pouches during 10 minutes. The results of the analyses are shown in Table 4.

TABLE 4

| Batch | 1 min | 2 min | 3 min | 4 min | 6 min | 8 min | 9 min | 10 min |
|---|---|---|---|---|---|---|---|---|
| Ref 2.1 | 0/50 | 0/50 | 0/50 | 0/50 | 0/50 | 0/50 | 0/50 | 0/50 |
| Ref 2.2 | — | — | — | 3/50 | 2/50 | 3/50 | 2/50 | 4/50 |
| Ref 2.3 | 27/50 | — | 50/50 | — | — | — | — | — |

Figure 7:
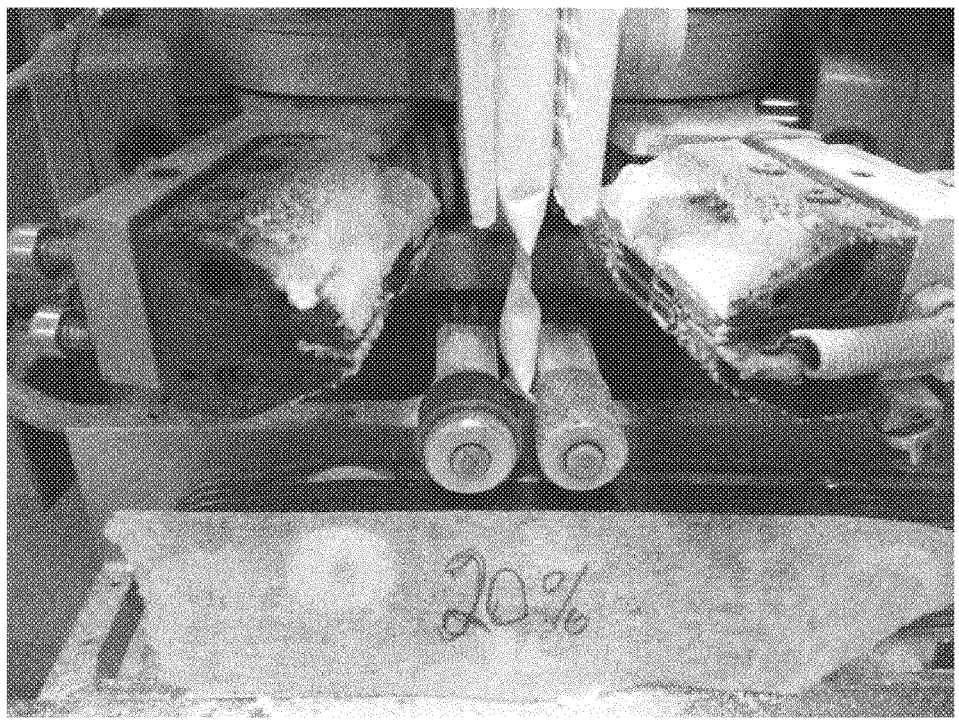
Figure 8:
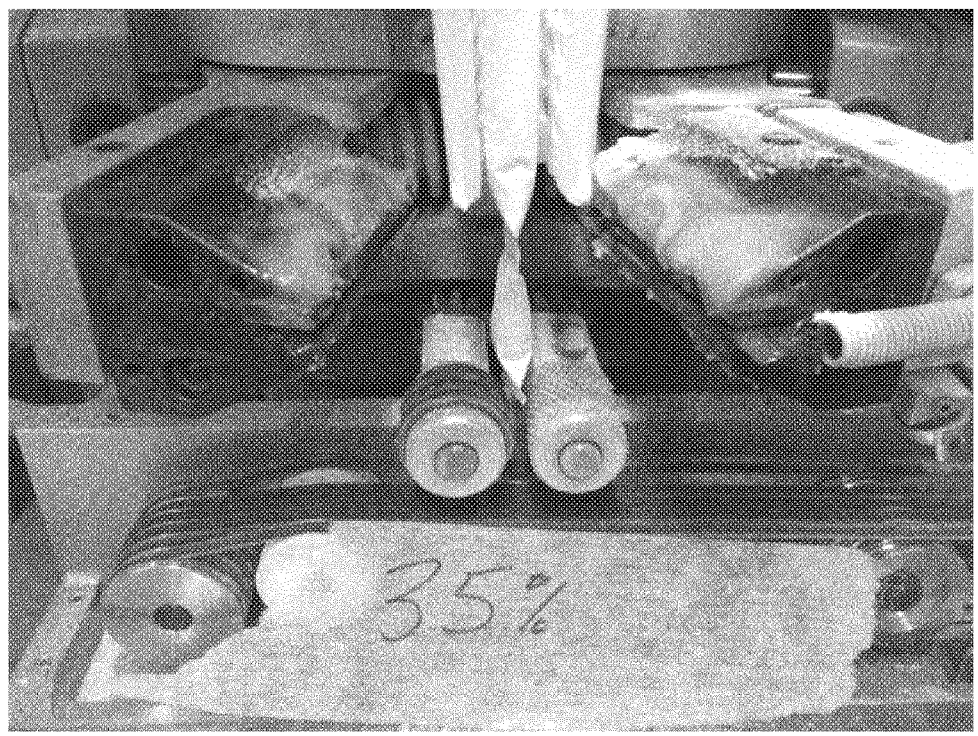

FIG. 7 shows the welding apparatus for batch ref. 2.1 after about 10 minutes. FIG. 8 shows the welding apparatus for batch ref. 2.2 after about 10 minutes.

Figure 10:
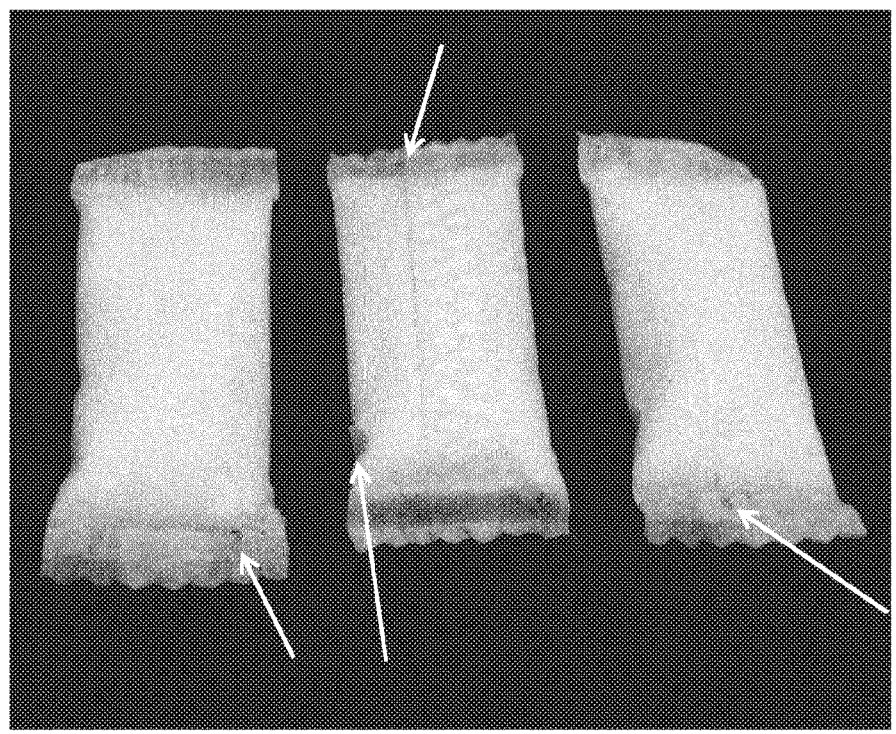
FIG. 10 is a photograph illustrating discolored pouched snuff products produced in accordance with Reference Example 2.

FIG. 10 is a photograph illustrating discolored pouched snuff products from batch 2.3.

This example illustrates that discoloration and/or significant deposition of filling material on the welding apparatus occur in the manufacture of oral pouched snuff products by heat melt-welding when the filling material comprises about 20-50% by weight, based on the dry weight of the filling material, of an ingredient having a melting temperature of about 150° C.

Reference Example 3: 20% by Weight of Xylitol in Heat Melt-Welded Pouches

One batch of powder mixture including xylitol (Xylisorb® 700, supplied by Roquette) and microcrystalline cellulose, MCC (Avicel PH-200, supplied by FMC Biopolymer) was prepared, according to Table 5, using a Dinnissen Pegasus PG-10(VC) lab mixer. The mixing time was 2 minutes and the mixing speed was 70 Hz.

Xylisorb® 700, has, according to the supplier's product information, a melting point of about 90-95° C.

TABLE 5

| Batch | Amount of xylitol (g) | Amount of MCC (g) | Percentage of xylitol (% by weight) |
|---|---|---|---|
| Ref 3.1 | 1000 | 4000 | 20 |

The batch of powder mix was packed in pouches using a Merz SB 53-2/T packer with pressured air powder dosing of the powder mixture into an advancing tubular web of pouch material. Sealing of the of the tubular web along the direction of travel as well as transverse to the direction of travel were made by heat melt-welding. The temperature of the welding parts was about 300° C. and the pouch packing speed was 200 pouches per minute.

The moisture content of the product was below 5% by weight based on the total weight of the product.

50 samples of packed pouches were taken every minute and analysed for frequency of stained/discolored pouches during 10 minutes. The results of the analyses are shown in Table 6.

TABLE 6

| Batch | 1 min | 2 min | 3 min | 4 min | 7 min | 8 min | 9 min | 10 min |
|---|---|---|---|---|---|---|---|---|
| Ref 3.1 | 2/50 | 3/50 | 1/50 | — | 6/50 | 2/50 | 1/50 | 1/50 |

Figure 9:

FIG. 9 shows the welding apparatus for batch ref. 3.1 after about 10 minutes.

This example illustrates that discoloration occur in the manufacture of oral pouched snuff products by heat melt-welding when the filling material comprises about 20% by weight, based on the dry weight of the filling material, of an ingredient having a melting temperature of about 90-95° C.

Example 1: 50% by Weight of Maltitol in Ultrasonically Welded Pouches

One batch of powder mixture including maltitol (Maltidex CH 16835, supplied by Cargill) and microcrystalline cellulose, MCC (Avicel PH-200, supplied by FMC Biopolymer) was prepared, according to Table 7, using a Dinnissen Pegasus PG-10(VC) lab mixer. The mixing time was 2 minutes and the mixing speed was 70 Hz.

TABLE 7

| Batch | Amount of maltitol (g) | Amount of MCC (g) | Percentage of maltitol (% by weight) |
|---|---|---|---|
| 1.1 | 2500 | 2500 | 50 |

The batch was packed in pouches using a Merz SB 53-2/T packer with pressured air powder dosing of the powder mixture into an advancing tubular web of pouch material. Sealing of the tubular web along the direction of travel was made by heat-melt welding and sealing transverse to the direction of travel of the tubular web was made by ultrasonic welding using a Rinco UGH35-750P-230 ultrasonic welding apparatus. The pouch packing speed was 200 pouches per minute.

Each produced pouched snuff product contained a pouch having two ultrasonically provided transverse (opposite) side seals, each one having a seal width of about ≤1 mm and sealing an outermost end portion of the pouch, and a heat melt-welded longitudinal seal.

The moisture content of the product was below 5% by weight based on the total weight of the product.

50 samples of packed pouches were taken every minute and analysed for frequency of stained pouches during 10 minutes. The results of the analyses are shown in Table 8.

TABLE 8

| Batch | 1 min | 2 min | 3 min | 4 min | 7 min | 8 min | 9 min | 10 min |
|---|---|---|---|---|---|---|---|---|
| 1.1 | 0/50 | 0/50 | 0/50 | 0/50 | 0/50 | 0/50 | 0/50 | 0/50 |

As seen from Table 8, no discoloration of the products was identified. This may be compared to the results of Reference Example 2.

Example 2: 100% by Weight of Xylitol in Ultrasonically Welded Pouches

A sample of pure xylitol (Xylisorb 700, supplied by Roquette) was packed in pouches using a Merz SB 53-2/T packer with pressured air powder dosing of the powder mixture into an advancing tubular web of pouch material.

Sealing of the tubular web along the direction of travel was made by heat-melt welding and sealing transverse to the direction of travel of the tubular web was made by ultrasonic welding using a Rinco UGH35-750P-230 ultrasonic welding apparatus. The pouch packing speed was 200 pouches per minute.

Each produced pouched snuff product contained a pouch having two ultrasonically provided transverse (opposite) side seals, each one having a seal width of about ≤1 mm and sealing an outermost end portion of the pouch, and a heat melt-welded longitudinal seal.

The moisture content of the product was below 5% by weight based on the total weight of the product.

50 samples of packed pouches were taken every minute and analysed for frequency of stained pouches during 10 minutes. The results of the analyses are shown in Table 9.

TABLE 9

| Batch | 1 min | 2 min | 3 min | 4 min | 6 min | 8 min | 9 min | 10 min |
|---|---|---|---|---|---|---|---|---|
| 2.1 | 0/50 | 0/50 | 0/50 | 0/50 | 0/50 | 0/50 | 0/50 | 0/50 |

As seen from Table 9, no discoloration of the products was identified. This may be compared to the results of Reference Example 3.

The invention claimed is:

1. A method for producing an oral pouched snuff product comprising a filling material and a saliva-permeable pouch enclosing the filling material, said oral pouched snuff product having a moisture content of at most 20% by weight based on total weight of the product, said saliva-permeable pouch having one or more seals, and said filling material comprising at least 20% by weight, based on dry weight of the filling material, of maltitol, the method comprising:
   supplying and advancing at least one web of packaging material, said at least one web of packaging material advancing in a direction of travel;
   supplying the filling material to said at least one advancing web of packaging material; and
   welding and cutting said at least one advancing web of packaging material to which the filling material has been supplied to provide a plurality of pouches enclosing the filling material, wherein said welding of said at least one advancing web of packaging material to which the filling material has been supplied is provided by ultrasonic welding.

2. The method according to claim 1, comprising:
   forming said at least one advancing web of packaging material into a tubular web, said forming being performed before or after supplying said filling material, thereby providing an advancing tubular web of packaging material containing the filling material; and
   ultrasonically welding and cutting said advancing tubular web of packaging material containing the filling material.

3. The method according to claim 1, wherein said ultrasonic welding and cutting are performed simultaneously thereby providing a cut in a welded area.

4. The method according to claim 1, wherein said filling material further comprises at least one ingredient selected from the group consisting of monosaccharides, disaccharides, sugar alcohols and any combinations thereof.

5. The method according to claim 4, wherein said at least one ingredient is a sugar alcohol.

6. The method according to claim 4, wherein said at least one ingredient is a sugar alcohol selected from the group consisting of sorbitol, xylitol and any combinations thereof.

7. The method according to claim 1, wherein the filling material comprises at least 35% by weight, based on dry weight of the filling material, of maltitol.

8. The method according to claim 1, wherein the packaging material is nonwoven comprising staple fibres of regenerated cellulose and a binder.

9. The method according to claim 1, wherein the oral pouched snuff product is selected from the group consisting of oral pouched smokeless tobacco products, oral pouched nicotine-containing tobacco-free snuff products and oral pouched nicotine-free tobacco-free snuff products.

10. An oral pouched snuff product comprising a filling material and a saliva-permeable pouch of a packaging material enclosing the filling material, said oral pouched snuff product having a moisture content of at most 20% by weight based on total weight of the product, said saliva-permeable pouch comprising at least one elongated seal sealing the packaging material and having a seal length extending along a first direction and a seal width extending along a second direction transverse to said first direction, and said filling material comprising at least 20% by weight, based on dry weight of the filling material, of maltitol, wherein:
   said seal width being equal to or less than 2 mm, and
   said at least one elongated seal being an ultrasonically provided weld formed by simultaneous ultrasonic welding and cutting of the packaging material such that a cut is provided in a welded area, thereby at least one outermost end portion of the pouch being sealed by the at least one elongated seal.

11. The oral pouched snuff product according to claim 10, wherein the oral pouched snuff product has a longitudinal direction and a transverse direction perpendicular to the longitudinal direction, the saliva-permeable pouch comprises a first elongated seal and a second elongated seal, each of said first and second elongated seals has a seal length extending along the transverse direction of the product and a seal width extending along the longitudinal direction of the product, said seal width being equal to or less than 2 mm, and each of said first and second elongated seals is sealing an outermost end portion of the saliva-permeable pouch.

12. The oral pouched snuff product according to claim 11, wherein the saliva-permeable pouch comprises an additional elongated seal having a seal length extending along the longitudinal direction of the product and a seal width extending along the transverse direction of the product, said seal width being equal to or less than 2 mm.

13. The oral pouched snuff product according to claim 10, wherein said oral pouched snuff product has a moisture content of at most 5% by weight based on total weight of the oral pouched snuff product.

14. The oral pouched snuff product according to claim 10, wherein said filling material further comprises at least one ingredient selected from the group consisting of monosaccharides, disaccharides, sugar alcohols and any combinations thereof.

15. The oral pouched snuff product according to claim 14, wherein said at least one ingredient is a sugar alcohol.

16. The oral pouched snuff product according to claim 14, wherein said at least one ingredient is a sugar alcohol selected from the group consisting of mannitol, sorbitol, xylitol and any combinations thereof.

17. The oral pouched snuff product according to claim 10, wherein the filling material comprises at least 35% by weight, based on dry weight of the filling material, of maltitol.

18. The oral pouched snuff product according to claim 10, wherein the saliva-permeable pouch is made of nonwoven comprising staple fibers of regenerated cellulose and a binder.

19. The oral pouched snuff product according to claim 10, wherein the oral pouched snuff product is selected from the group consisting of oral pouched smokeless tobacco products, oral pouched nicotine-containing tobacco-free snuff products and oral pouched nicotine-free tobacco-free snuff products.

* * * * *